(12) United States Patent
Gohshi

(10) Patent No.: US 8,655,101 B2
(45) Date of Patent: Feb. 18, 2014

(54) SIGNAL PROCESSING DEVICE, CONTROL METHOD FOR SIGNAL PROCESSING DEVICE, CONTROL PROGRAM, AND COMPUTER-READABLE STORAGE MEDIUM HAVING THE CONTROL PROGRAM RECORDED THEREIN

(75) Inventor: Seiichi Gohshi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 140 days.

(21) Appl. No.: 13/375,251

(22) PCT Filed: Jan. 20, 2010

(86) PCT No.: PCT/JP2010/000299
§ 371 (c)(1),
(2), (4) Date: Nov. 30, 2011

(87) PCT Pub. No.: WO2010/140281
PCT Pub. Date: Dec. 9, 2010

(65) Prior Publication Data
US 2012/0070098 A1    Mar. 22, 2012

(30) Foreign Application Priority Data

Jun. 4, 2009 (JP) ................................. 2009-135285

(51) Int. Cl.
*G06K 9/40* (2006.01)
(52) U.S. Cl.
USPC ........... 382/275; 382/260; 382/263; 382/274; 358/3.26; 358/3.27; 358/463
(58) Field of Classification Search
USPC ........ 382/260, 263, 274, 275; 358/3.26, 3.27, 358/463
See application file for complete search history.

(56) References Cited

U.S. PATENT DOCUMENTS 5,694,491 A * 12/1997 Brill et al. ...................... 382/260
5,708,693 A * 1/1998 Aach et al. ....................... 378/62

(Continued)

FOREIGN PATENT DOCUMENTS

JP H07-184085 7/1995
JP 7-312704 A 11/1995

(Continued)

OTHER PUBLICATIONS

Seiichi Gohshi et al., "A Novel Super Resolution Method with Non-Linear Function," Forum on Information Technology, 2009 (held from Sep. 2 through Sep. 4, 2009) (Partial Translation).

(Continued)

*Primary Examiner* — Yosef Kassa
(74) *Attorney, Agent, or Firm* — Harness, Dickey & Pierce, P.L.C.

(57) ABSTRACT

A signal processing device first decomposes an input signal into a plurality of frequency components in different frequency ranges, then causes a higher harmonic wave generating section to generate a higher harmonic for each of a part or all of frequency components obtained by removing a frequency component in the lowest frequency range from frequency components obtained by the decomposition, and finally composes (i) the higher harmonic thus generated and (ii) a frequency component for which no higher harmonic has been generated. The higher harmonic wave generating section adds the frequency component and a nonlinear process signal (i) in which positive and negative signs of a frequency component for which the higher harmonic is to be generated are retained and (ii) which broadly monotonically increases nonlinearly with respect to the frequency component when the frequency component is located at least in the vicinity of zero.

17 Claims, 18 Drawing Sheets

(56) References Cited

U.S. PATENT DOCUMENTS

| | | | |
|---|---|---|---|
| 5,719,966 A * | 2/1998 | Brill et al. | 382/260 |
| 5,805,721 A * | 9/1998 | Vuylsteke et al. | 382/128 |
| 6,173,084 B1 * | 1/2001 | Aach et al. | 382/260 |
| 6,658,379 B1 | 12/2003 | Ogata | |
| 6,732,070 B1 * | 5/2004 | Rotola-Pukkila et al. | 704/219 |
| 6,791,716 B1 * | 9/2004 | Buhr et al. | 358/1.9 |
| 7,590,589 B2 * | 9/2009 | Hoffberg | 705/37 |
| 7,633,354 B2 | 12/2009 | Kuijk et al. | |
| 7,970,212 B2 * | 6/2011 | Zahavi et al. | 382/207 |
| 8,204,332 B2 * | 6/2012 | Sun | 382/260 |
| 2002/0181583 A1 | 12/2002 | Corbera | |
| 2003/0151684 A1 | 8/2003 | Shimazaki et al. | |
| 2003/0218776 A1 | 11/2003 | Morimoto et al. | |
| 2004/0252907 A1 | 12/2004 | Ito | |
| 2005/0123214 A1 | 6/2005 | Takahira | |
| 2006/0239361 A1 | 10/2006 | Iguchi et al. | |
| 2006/0285766 A1 | 12/2006 | Ali | |
| 2006/0285767 A1 | 12/2006 | Ali | |
| 2007/0140387 A1 | 6/2007 | Wong et al. | |
| 2007/0147478 A1 | 6/2007 | Lai et al. | |
| 2007/0269137 A1 | 11/2007 | Ida et al. | |
| 2011/0279730 A1 | 11/2011 | Goshi | |
| 2012/0081198 A1 | 4/2012 | Gohshi | |

FOREIGN PATENT DOCUMENTS

| | | |
|---|---|---|
| JP | H08-139969 | 5/1996 |
| JP | H09-233489 | 9/1997 |
| JP | 9307897 A | 11/1997 |
| JP | 09-319869 | 12/1997 |
| JP | 1166311 A | 3/1999 |
| JP | 11-340878 | 12/1999 |
| JP | 11345331 A | 12/1999 |
| JP | 2001169116 A | 6/2001 |
| JP | 2002-125200 | 4/2002 |
| JP | 2002-335527 | 11/2002 |
| JP | 2003-69859 | 3/2003 |
| JP | 2003101774 A | 4/2003 |
| JP | 2003134352 A | 5/2003 |
| JP | 2003-198878 | 7/2003 |
| JP | 2003283835 A | 10/2003 |
| JP | 2005117549 A | 4/2005 |
| JP | 2005-191895 | 7/2005 |
| JP | 2006157584 A | 6/2006 |
| JP | 2006-304352 | 11/2006 |
| JP | 2006-304352 A | 11/2006 |
| JP | 2006-310934 | 11/2006 |
| JP | 2007-174637 | 7/2007 |
| JP | 2007265122 A | 10/2007 |
| JP | 2007-310837 A | 11/2007 |
| JP | 2008-103785 | 5/2008 |
| JP | 2009-198935 | 9/2009 |
| WO | WO-9835449 A1 | 8/1998 |
| WO | WO 02/084997 | 10/2002 |
| WO | WO-2007078829 A1 | 7/2007 |
| WO | WO 2010/113342 | 10/2010 |
| WO | WO-2010113342 A1 | 10/2010 |
| WO | WO 2010/146728 | 12/2010 |
| WO | WO 2011/061958 | 5/2011 |

OTHER PUBLICATIONS

Seiichi Gohshi, "A New Signal Processing Method for VIDEO—Reproduce the Frequency Spectrum Exceeding the Nyquist Frequency," Multimedia System Conference (announced on Feb. 22, 2012).

English version of International Search Report dated Dec. 20, 2011 (PCT/JP2011/071706).

English version of International Search Report dated Apr. 6, 2010 (PCT/JP2010/000372).

English version of International Search Report dated Dec. 7, 2010 (PCT/JP2010/069841).

English version of ISR including the Written Opinion of the ISA(PCT/JP2010/000299) mailed on Mar. 9, 2010.

Matsumoto Nobuyuki and Ida Takashi, "A study on One Frame Reconstruction-based Super-resolution Using Image Segmentation", IEICE technical report, The Institute of Electronics, Information and Communication Engineers (IEICE), vol. 108(4), IE2008-6, pp. 31-36, Apr. 2008.

Luminita A. Vese and Stanley J. Osher, "Modeling textures with total variation minimization and oscillating patterns in image processing" Journal of Scientific Computing, vol. 19, Nos. 1-3, Dec. 2003.

Shingo Aoki et al., "Wavelet transform coding by zero value tree structure and vector quantization", Picture Coding Symposium of Japan, Proceedings of the 16th Symposium, Nov. 14, 2001, pp. 95 and 96.

* cited by examiner

SIGNAL PROCESSING DEVICE, CONTROL METHOD FOR SIGNAL PROCESSING DEVICE, CONTROL PROGRAM, AND COMPUTER-READABLE STORAGE MEDIUM HAVING THE CONTROL PROGRAM RECORDED THEREIN

TECHNICAL FIELD

The present invention relates to a signal processing device for enhancing an image quality by sharpening an image, a method for controlling a signal processing device, a control program, and a computer-readable storage medium in which the control program is recorded.

BACKGROUND ART

In order to improve an image quality, an image processing device, for example has carried out a process for sharpening an image (hereinafter referred to as a sharpening process). For example, a conventional television receiver carries out a contour compensation for steepening a rise and a fall of an image signal which correspond to contour parts of an image to be displayed therein. The contour compensation is carried out by extracting a high-frequency component of an image signal (a luminance signal) supplied to a display of the television receiver, amplifying the extracted high-frequency component, and adding the amplified extracted high-frequency component to the supplied image signal. This improves a frequency characteristic of the image signal which deteriorates due to a process carried out in each circuit of the television receiver, so that an apparent image quality is enhanced.

The following description discusses, with reference to FIG. 19, an example of a frequency spectrum of an image signal which has been subjected to the sharpening process by use of a conventional technique for carrying out the contour compensation described above. (a) of FIG. 19 is a schematic view illustrating a frequency spectrum of an image signal having a sampling frequency fs. (b) of FIG. 19 is a schematic view illustrating a frequency spectrum of an image signal obtained by carrying out the sharpening process by use of the conventional technique with respect to the image signal having the frequency spectrum illustrated in (a) of FIG. 19, the conventional technique being a technique for carrying out the contour compensation described above.

As described above, a high-frequency component is added to an image signal which has been subjected to the sharpening process by use of the conventional technique. This causes an increase in frequency component in the vicinity of a Nyquist frequency fs/2 which is half of the sampling frequency fs (see (b) of FIG. 19).

Normally, the sharpening process by use of the conventional technique (described above) is a process for carrying out a linear operation with respect to an image signal. Therefore, a frequency component higher than the Nyquist frequency (a high-frequency component which is not contained in an image signal to be processed) cannot be used in the sharpening process by use of the conventional technique. This prevents improvement in image quality especially in a case where an enlargement process is carried out with respect to an image.

For example, the following description discusses a case where an image whose resolution is half of a full high-definition is subjected to an enlargement process and then displayed in a display of a television receiver of a high definition television (HDTV) (having a full high-definition of 1080× 1920 pixels). Assume here that the enlargement process is a process for horizontally doubling the number of pixels by upconverting the image signal having a frequency spectrum illustrated in (a) of FIG. 19. In this case, a new sampling frequency (described as Fbs) of the image signal which has been subjected to the enlargement process is twice the sampling frequency fs (Fbs=2fs).

The following description discusses, with reference to FIG. 20, a frequency spectrum of the image signal which has been subjected to the enlargement process. FIG. 20 is a schematic view illustrating a frequency spectrum of the image signal which has been subjected to the enlargement process. There exists no frequency component between the Nyquist frequency fs/2 with respect to the sampling frequency fs and the Nyquist frequency Fbs/2 (=fs) with respect to the new sampling frequency Fbs (see FIG. 20). Same applies to a space between Fbs/2 and 3fs/2.

Accordingly, even if the sharpening process by use of the conventional technique is carried out with respect to the image signal which has been subjected to the enlargement process, it is impossible to extract a frequency component in the vicinity of the Nyquist frequency Fbs/2 which frequency component is a high-frequency component of the image signal which has been subjected to the enlargement process.

Consequently, even if the sharpening process by use of the conventional technique is carried out with respect to the image signal which has been subjected to the enlargement process, an image which has been subjected to the enlargement process is displayed in a blur.

In contrast, Non Patent Literature 1 and Patent Literature 3 disclose techniques for obtaining a high-resolution image by use of, for example, inter-frame or intra-frame autocorrelation also in a case where an image is subjected to an enlargement process.

Non Patent Literature 2 discloses a technique for obtaining a high-resolution image by use of a non-isotropic diffusion filter, the non-isotropic diffusion filter carrying out smoothing processes which are different in degree between a tangential direction and a perpendicular direction of an edge included in an image.

Patent Literature 1 discloses an image processing device which in order to improve an image quality by emphasizing a high-frequency component, uses a nonlinear circuit for adjusting each of a coring amount, a clipping amount, an enhancement amount, a limit amount, and the like of a signal to add to an image signal.

Patent Literature 2 discloses an image quality compensation circuit which in order to compensate for a high-frequency signal without lowering a video quality, uses a nonlinear conversion circuit for preventing edge parts of a pulse waveform and a step waveform of an image signal from being linked.

CITATION LIST

Patent Literature
  Patent Literature 1
  Japanese Patent Application Publication, Tokukai, No. 2006-304352 A (Publication Date: Nov. 2, 2006)
  Patent Literature 2
  Japanese Patent Application Publication, Tokukaihei, No. 7-312704 A (Publication Date: Nov. 28, 1995)
  Patent Literature 3
  Japanese Patent Application Publication, Tokukai, No. 2007-310837 A (Publication Date: Nov. 29, 2007)

Non-Patent Literature

Non Patent Literature 1

MATSUMOTO Nobuyuki and IDA Takashi, "A study on One Frame Reconstruction-based Super-resolution Using Image Segmentation", IEICE technical report, The Institute of Electronics, Information and Communication Engineers (IEICE), Vol. 108(4), IE2008-6, pp. 31-36, April 2008

Non Patent Literature 2

Luminita A. Vese and Stanley J. Osher, "Modeling textures with total variation minimization and oscillating patterns in image processing" Journal of Scientific Computing, Vol. 19, Nos. 1-3, December 2003

SUMMARY OF INVENTION

Technical Problem

However, a large-scale integration (LSI) is necessary for implementation of the technique disclosed in Non Patent Literature 1. This causes a problem of increase in cost.

According to the technique disclosed in Non Patent Literature 2, a process carried out in the image quality compensation circuit is complicated, which is unsuitable for a real-time process. This causes a problem such that the technique disclosed in Non Patent Literature 2 cannot be applied to a moving image to be displayed in a television receiver, for example.

Each of the techniques disclosed in Patent Literatures 1 and 2 uses the nonlinear process for limited processes for clipping a signal to add to an image signal and preventing linking due to compensation for a high-frequency signal. This causes a problem such that an image which has been subjected to an enlargement process cannot be sufficiently sharpened.

The technique disclosed in Patent Literature 3 has a problem such that there occurs a difference in degree of improvement depending on a raw image. Namely, an image may be improved remarkably or less remarkably depending on the image. This causes a problem such that a degree of improvement varies depending on a region of an image and a degree of improvement varies depending on time in the case of a video.

The present invention has been made in view of the problems, and an object of the present invention is to provide a signal processing device, for example which has a simple arrangement and is capable of highly sharpening a static image and a moving image.

Solution to Problem

In order to attain the object, a signal processing device in accordance with the present invention which carries out a process for sharpening an image with respect to an input signal representing the image, so as to output an output signal representing the image which has been sharpened, the signal processing device includes: frequency component decomposition means for decomposing the input signal into a plurality of frequency components in different frequency ranges; higher harmonic wave generating means for generating a higher harmonic wave for each of a part or all of frequency components obtained by removing a frequency component in the lowest frequency range from frequency components into which the frequency component decomposition means has decomposed; and output signal generating means for composing (i) the higher harmonic wave generated by the higher harmonic wave generating means and (ii) a frequency component for which no higher harmonic wave has been generated by the higher harmonic wave generating means of the frequency components into which the frequency component decomposition means has decomposed, so as to generate the output signal, the higher harmonic wave generating means including: nonlinear process means for generating a nonlinear process signal (i) in which positive and negative signs of a frequency component for which the higher harmonic wave is to be generated are retained and (ii) which broadly monotonically increases nonlinearly with respect to the frequency component when the frequency component is located at least in the vicinity of 0 (zero); and addition means for adding the nonlinear process signal to the frequency component, so as to generate the higher harmonic wave.

In order to attain the object, a method in accordance with the present invention for controlling a signal processing device which carries out a process for sharpening an image with respect to an input signal representing the image, so as to output an output signal representing the image which has been sharpened, the method includes the steps of: (a) decomposing the input signal into a plurality of frequency components in different frequency ranges; (b) generating a higher harmonic wave for each of a part or all of frequency components obtained by removing a frequency component in the lowest frequency range from frequency components into which the step (a) has decomposed; and (c) composing (i) the higher harmonic wave generated by the step (b) and (ii) a frequency component for which no higher harmonic wave has been generated by the step (b) of the frequency components into which the step (a) has decomposed, so as to generate the output signal, the step (b) including the steps of: (d) generating a nonlinear process signal (i) in which positive and negative signs of a frequency component for which the higher harmonic wave is to be generated are retained and (ii) which broadly monotonically increases nonlinearly with respect to the frequency component when the frequency component is located at least in the vicinity of 0 (zero); and (e) adding the nonlinear process signal to the frequency component, so as to generate the higher harmonic wave.

According to the arrangement, the input signal representing the image is decomposed into a plurality of frequency components in different frequency ranges. A higher harmonic wave is generated each of a part or all of frequency components obtained by removing a frequency component in the lowest frequency range from frequency components into which the frequency component decomposition means has decomposed. (i) The higher harmonic wave thus generated and (ii) a frequency component for which no higher harmonic wave has been generated of the frequency components into which the frequency component decomposition means has decomposed are composed, so that the output signal representing the image which has been sharpened is generated. Further, the higher harmonic wave thus generated is obtained by adding (I) a frequency component for which the higher harmonic wave is to be generated and (II) a nonlinear process signal (i) in which positive and negative signs of a frequency component for which the higher harmonic wave is to be generated are retained and (ii) which broadly monotonically increases nonlinearly with respect to the frequency component when the frequency component is located at least in the vicinity of 0 (zero).

Consequently, it is possible to generate not only a higher harmonic wave for each of a part or all of frequency components obtained by removing a frequency component in the lowest frequency range, the each frequency component being contained in the input signal representing the image, but also the output signal obtained by composing the higher harmonic wave and the frequency component for which no higher harmonic wave is generated. Note here that the higher harmonic wave is generated by, for example, adding (i) the frequency component for which the higher harmonic wave is to be generated and (ii) the nonlinear process signal which has been subjected to a nonlinear process for, for example, squaring the frequency component. In the higher harmonic wave thus generated, positive and negative signs of the frequency component for which the higher harmonic wave is to be generated are retained.

The higher harmonic wave which is generated by being subjected to such a nonlinear process contains a high-frequency component which is not contained in an original frequency component. This allows the output signal which has been composed by use of the higher harmonic wave thus generated to contain a frequency component higher than a Nyquist frequency which is half of a sampling frequency that is used to discretize the input signal.

In contrast, a process for carrying out a linear operation with respect to an input signal as in the case of the conventional technique cannot compensate for a high-frequency range which exceeds the Nyquist frequency.

Accordingly, the nonlinear process carried out by the signal processing device in accordance with the present invention allows a rise and a fall of a signal which correspond to contour parts (edges) included in an image to be steeper as compared to a process for carrying out a linear operation with respect to an input signal. This yields an effect of allowing the image to be sharper and allowing great improvement in image quality.

Especially in a case where an image signal representing an image which has been subjected to an enlargement process is an input signal, in the process for carrying out the linear operation with respect to the input signal, it is impossible to extract a frequency component higher than the Nyquist frequency which is half of the sampling frequency of the image signal which has been subjected to the enlargement process. In contrast, according to the signal processing device in accordance with the present invention, it is possible to add, to the image signal which has been subjected to the enlargement process, a frequency component higher than the Nyquist frequency of the image signal which has been subjected to the enlargement process.

This yields an effect of allowing great improvement in image quality of the image which has been subjected to the enlargement process.

For a fuller understanding of the nature and advantages of the invention, reference should be made to the ensuing detailed description taken in conjunction with the accompanying drawings.

BRIEF DESCRIPTION OF DRAWINGS

FIG. 1 is a block diagram illustrating an arrangement of a signal processing device in accordance with an embodiment of the present invention.

FIG. 2 is a block diagram illustrating a first arrangement of a frequency component decomposition section and a signal reconstruction section which are included in the signal processing device illustrated in FIG. 1.

FIG. 3 is a block diagram illustrating a second arrangement of the frequency component decomposition section and the signal reconstruction section which are included in the signal processing device illustrated in FIG. 1.

FIG. 4 is a block diagram illustrating an arrangement of a higher harmonic wave generating section included in the signal processing device illustrated in FIG. 1.

Figure 4:
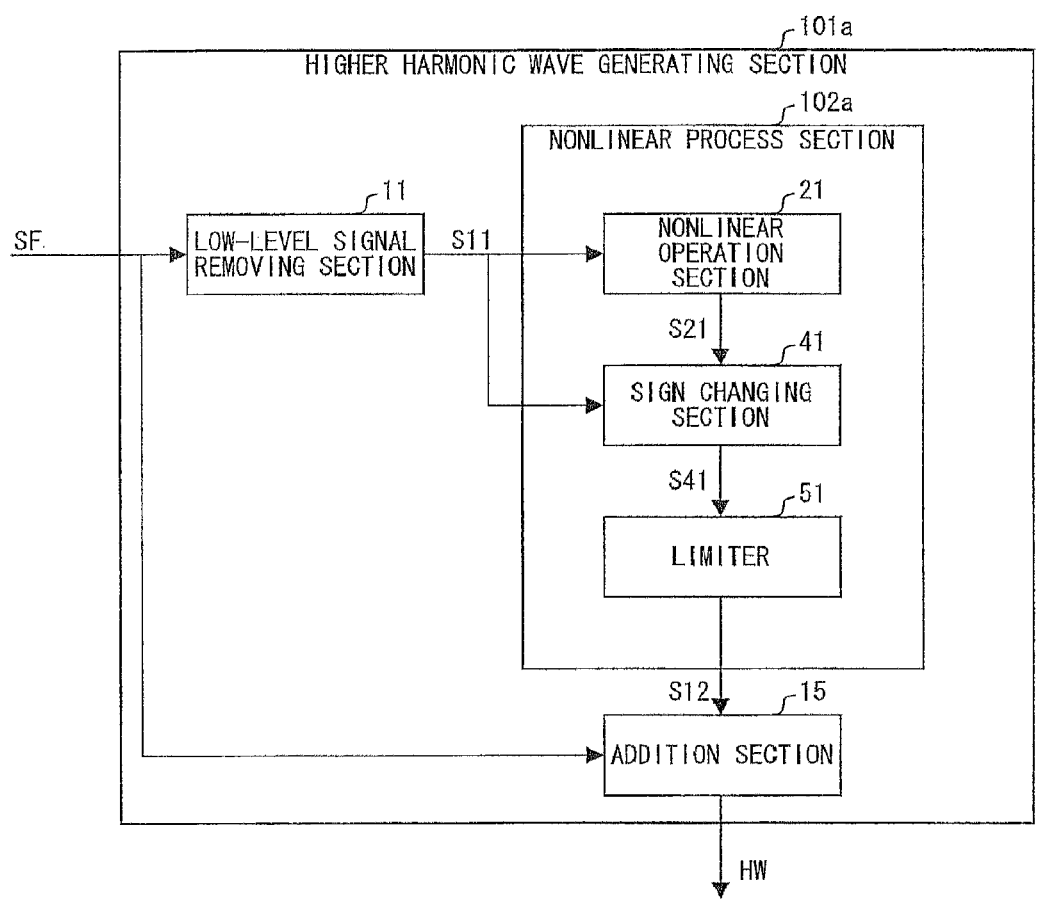
FIG. 4
Figure 5:
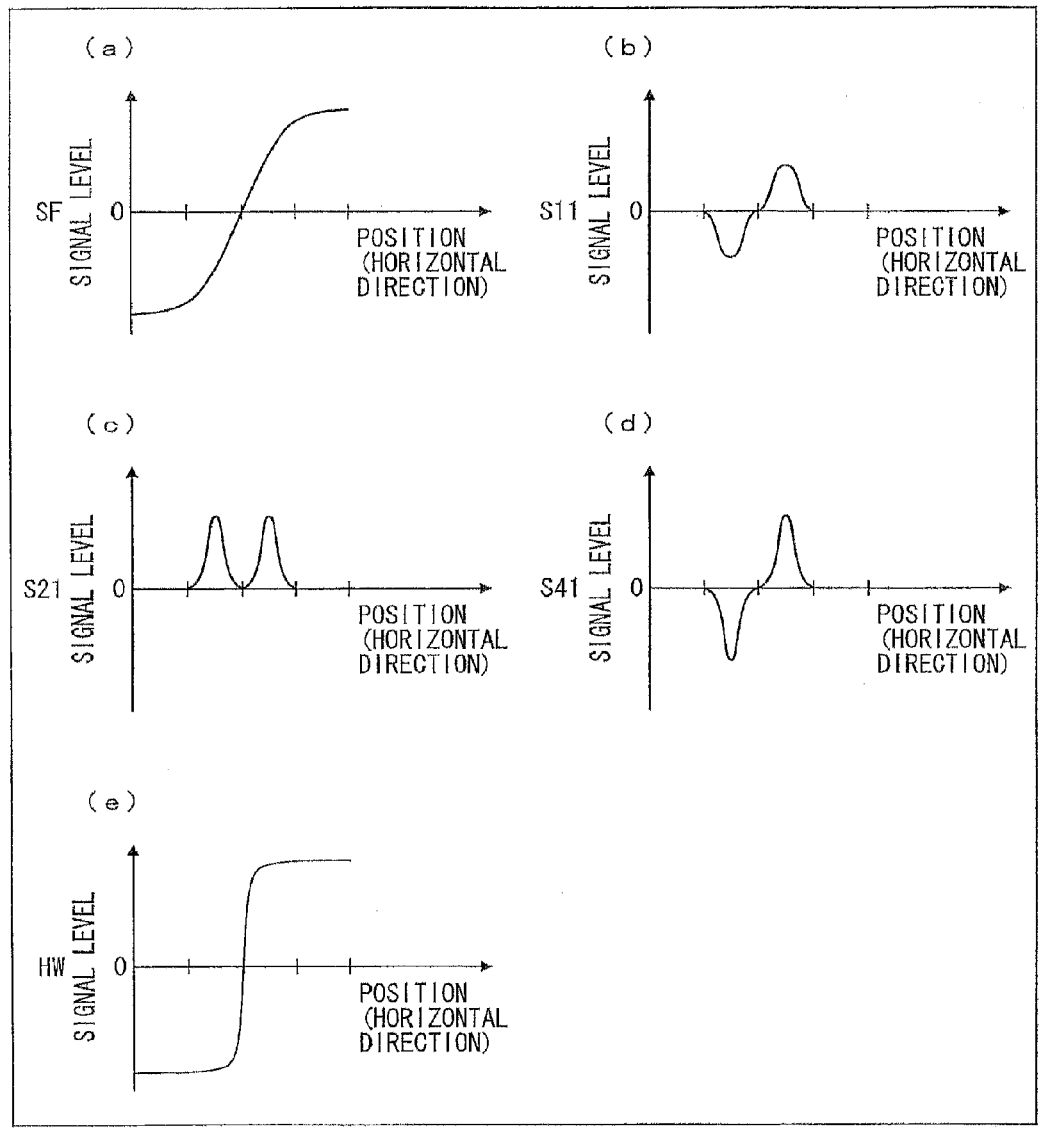
FIG. 5

(a) of FIG. 5 schematically illustrates a waveform of a signal which is supplied to the higher harmonic wave generating section illustrated in FIG. 4. (b) of FIG. 5 schematically illustrates a waveform of a nonlinear process target signal which is generated by the higher harmonic wave generating section illustrated in FIG. 4. (c) of FIG. 5 schematically illustrates a waveform of a nonlinear signal which is generated by the higher harmonic wave generating section illustrated in FIG. 4. (d) of FIG. 5 schematically illustrates a waveform of a sign change signal which is generated by the higher harmonic wave generating section illustrated in FIG. 4. (e) of FIG. 5 schematically illustrates a waveform of a higher harmonic wave which is generated by the higher harmonic wave generating section illustrated in FIG. 4.

FIG. 6

Figure 6:
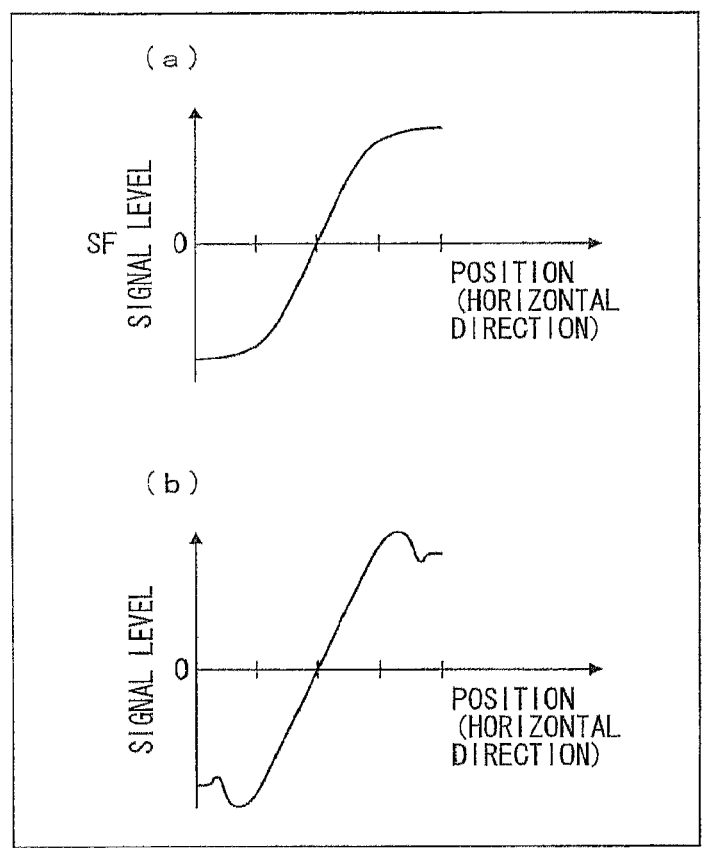

(a) of FIG. 6 schematically illustrates a waveform of a signal which is supplied to the higher harmonic wave generating section illustrated in FIG. 4. (b) of FIG. 6 schematically illustrates a waveform of a signal obtained by enhancing the signal illustrated in (a) of FIG. 6 by use of a conventional technique.

FIG. 7

Figure 1:
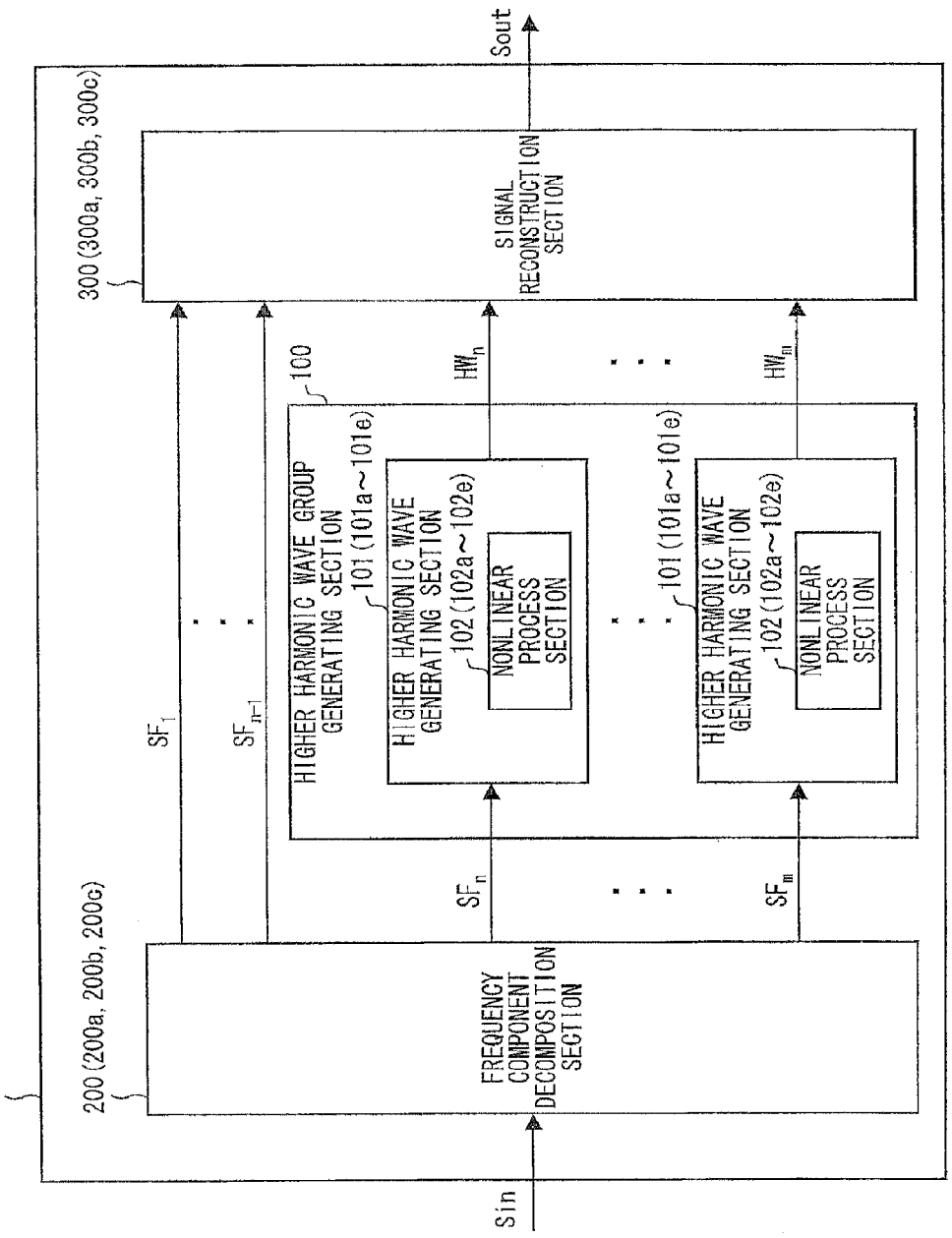
FIG. 1
Figure 7:
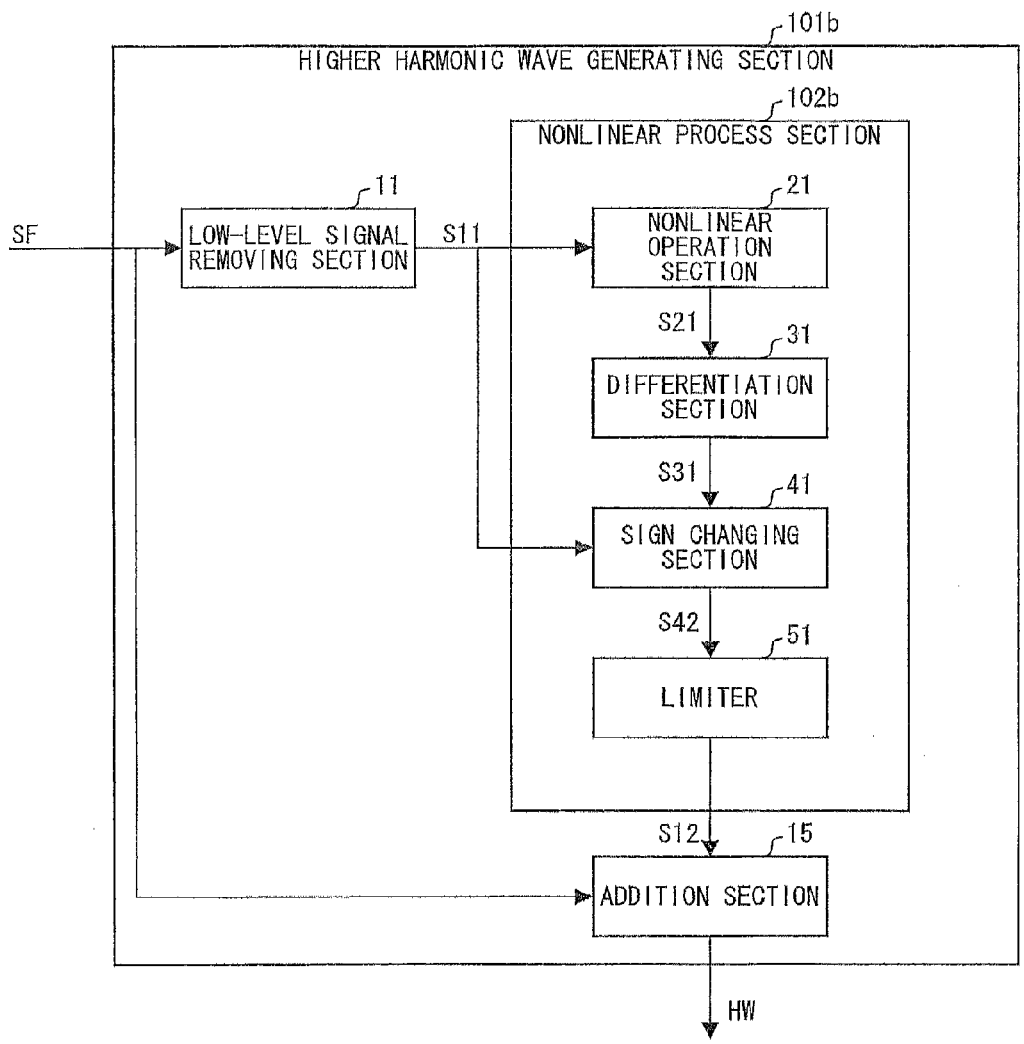

FIG. 7 is a block diagram illustrating a second arrangement of the higher harmonic wave generating section included in the signal processing device illustrated in FIG. 1.

FIG. 8

Figure 8:
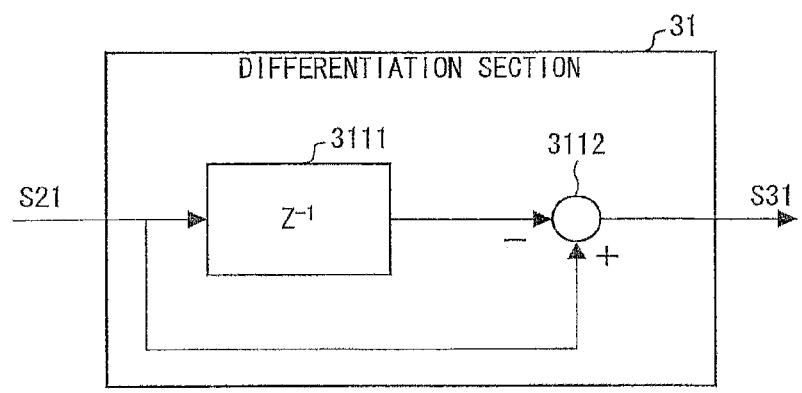

FIG. 8 is a block diagram illustrating an arrangement of a differentiation section included in the higher harmonic wave generating section illustrated in FIG. 7.

FIG. 9

Figure 9:
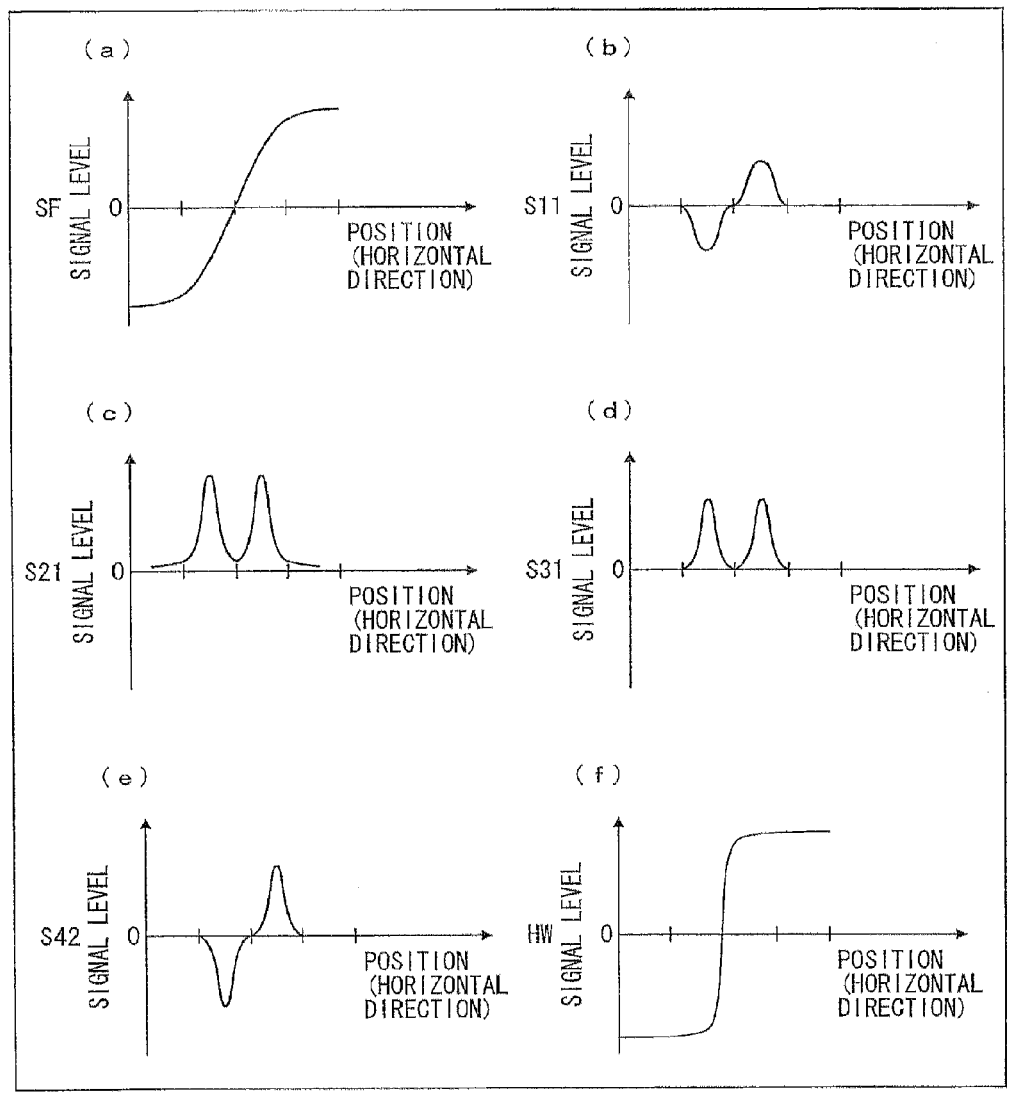

(a) of FIG. 9 schematically illustrates a waveform of a signal which is supplied to the higher harmonic wave generating section illustrated in FIG. 7. (b) of FIG. 9 schematically illustrates a waveform of a nonlinear process target signal which is generated by the higher harmonic wave generating section illustrated in FIG. 7. (c) of FIG. 9 schematically illustrates a waveform of a nonlinear signal which is generated by the higher harmonic wave generating section illustrated in FIG. 7. (d) of FIG. 9 schematically illustrates a waveform of a differential signal which is generated by the higher harmonic wave generating section illustrated in FIG. 7. (e) of FIG. 9 schematically illustrates a waveform of a sign change signal which is generated by the higher harmonic wave generating section illustrated in FIG. 7. (f) of FIG. 9 schematically illustrates a waveform of a higher harmonic wave which is generated by the higher harmonic wave generating section illustrated in FIG. 7.

FIG. 10

Figure 10:
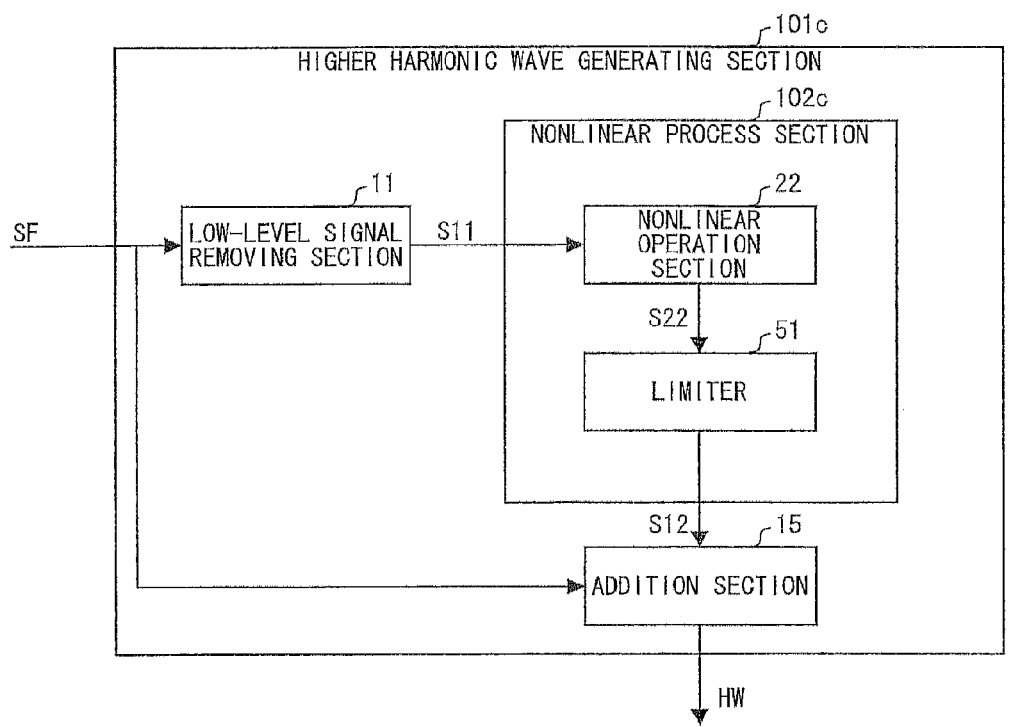

FIG. 10 is a block diagram illustrating a third arrangement of the higher harmonic wave generating section included in the signal processing device illustrated in FIG. 1.

FIG. 11

Figure 11:
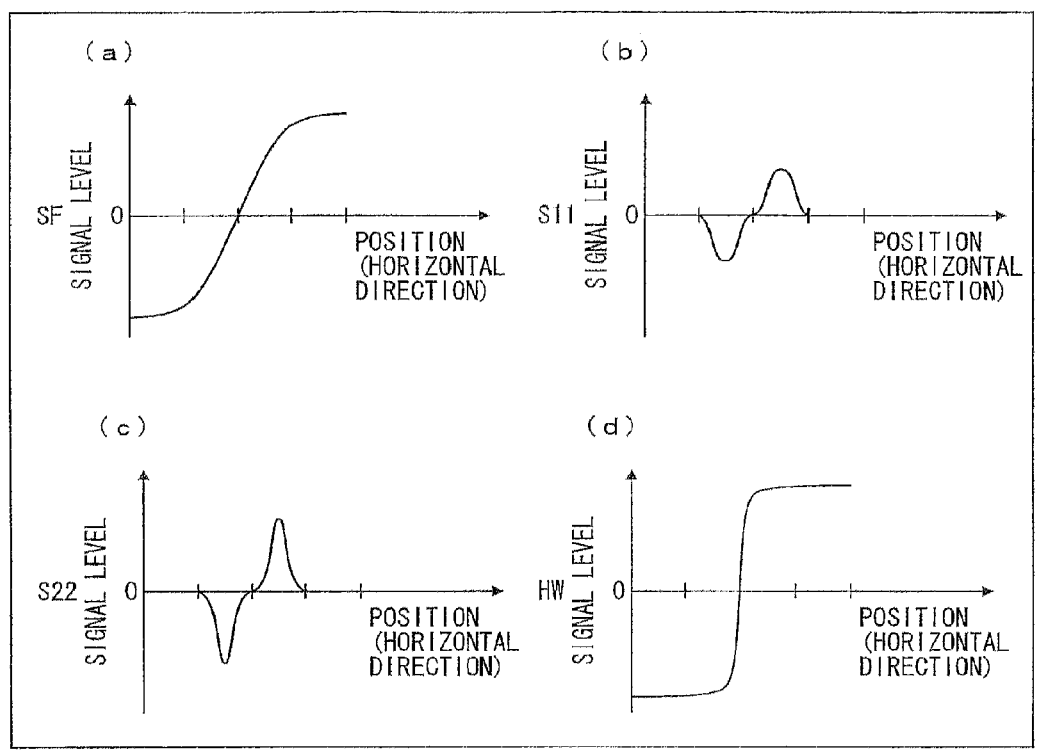

(a) of FIG. 11 schematically illustrates a waveform of a signal which is supplied to the higher harmonic wave generating section illustrated in FIG. 10. (b) of FIG. 11 schematically illustrates a waveform of a nonlinear process target signal which is generated by the higher harmonic wave generating section illustrated in FIG. 10. (c) of FIG. 11 schematically illustrates a waveform of a nonlinear signal which is generated by the higher harmonic wave generating section illustrated in FIG. 10. (d) of FIG. 11 schematically illustrates a waveform of a higher harmonic wave which is generated by the higher harmonic wave generating section illustrated in FIG. 10.

FIG. 12

Figure 12:
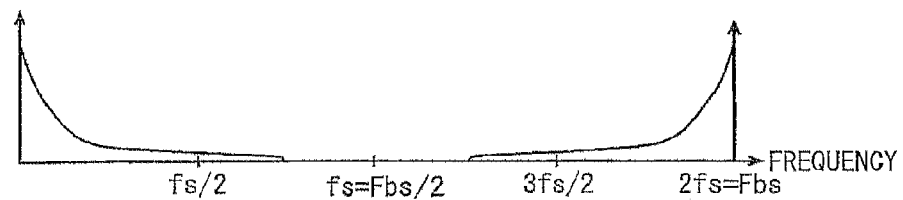
Figure 19:
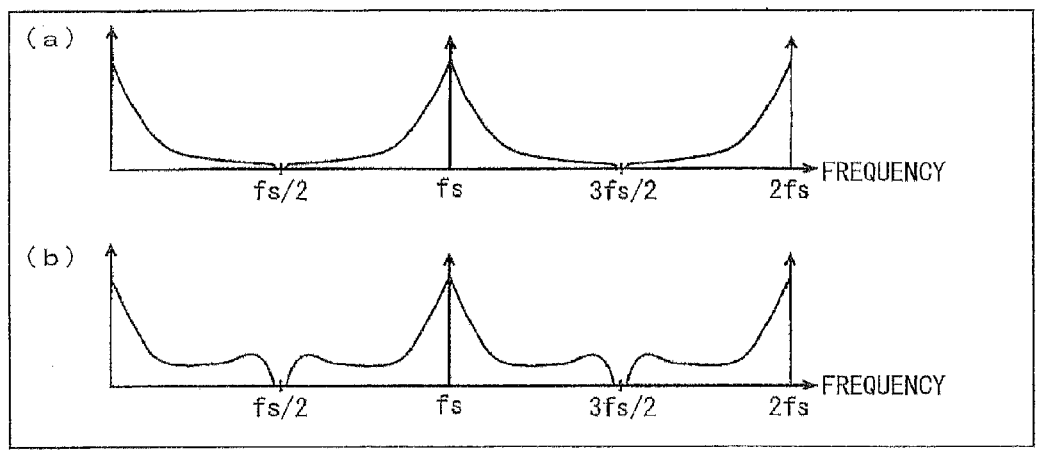

FIG. 12 is a schematic view illustrating a frequency spectrum of an image signal obtained by carrying out a sharpening process in the signal processing device illustrated in FIG. 1 with respect to an image signal having a frequency spectrum illustrated in (a) of FIG. 19.

FIG. 13

Figure 13:

FIG. 13 shows an image including an image to be subjected to the sharpening process.

FIG. 14

Figure 14:
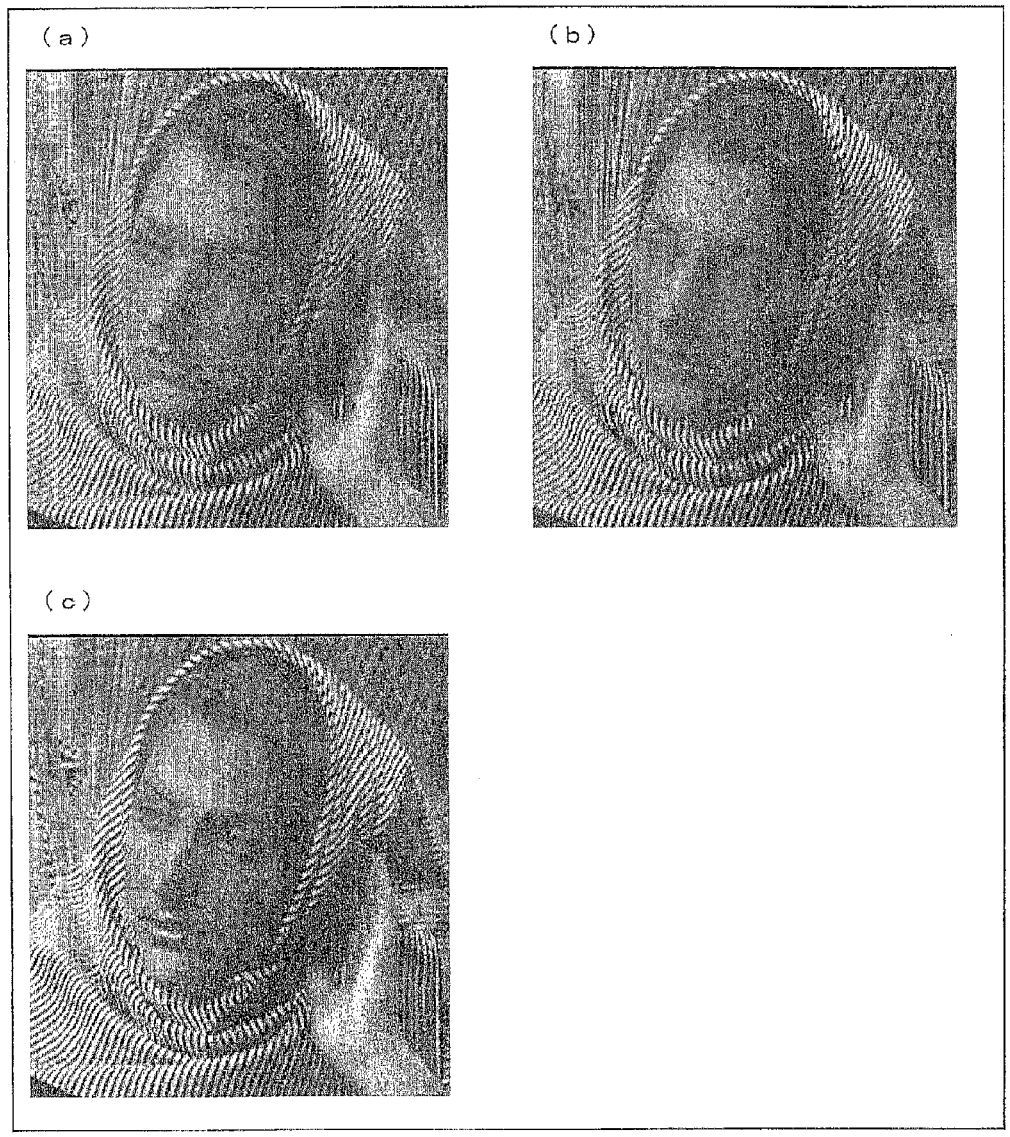

(a) of FIG. 14 shows an image obtained by doubling the length and the breadth of an upper right region of the original image illustrated in FIG. 13. (b) of FIG. 14 shows an image obtained by carrying out the sharpening process by use of a conventional technique with respect to the image illustrated in (a) of FIG. 14. (c) of FIG. 14 shows an image obtained by carrying out the sharpening process by the signal processing device illustrated in FIG. 1 with respect to the image illustrated in (a) of FIG. 14.

FIG. 15

Figure 3:
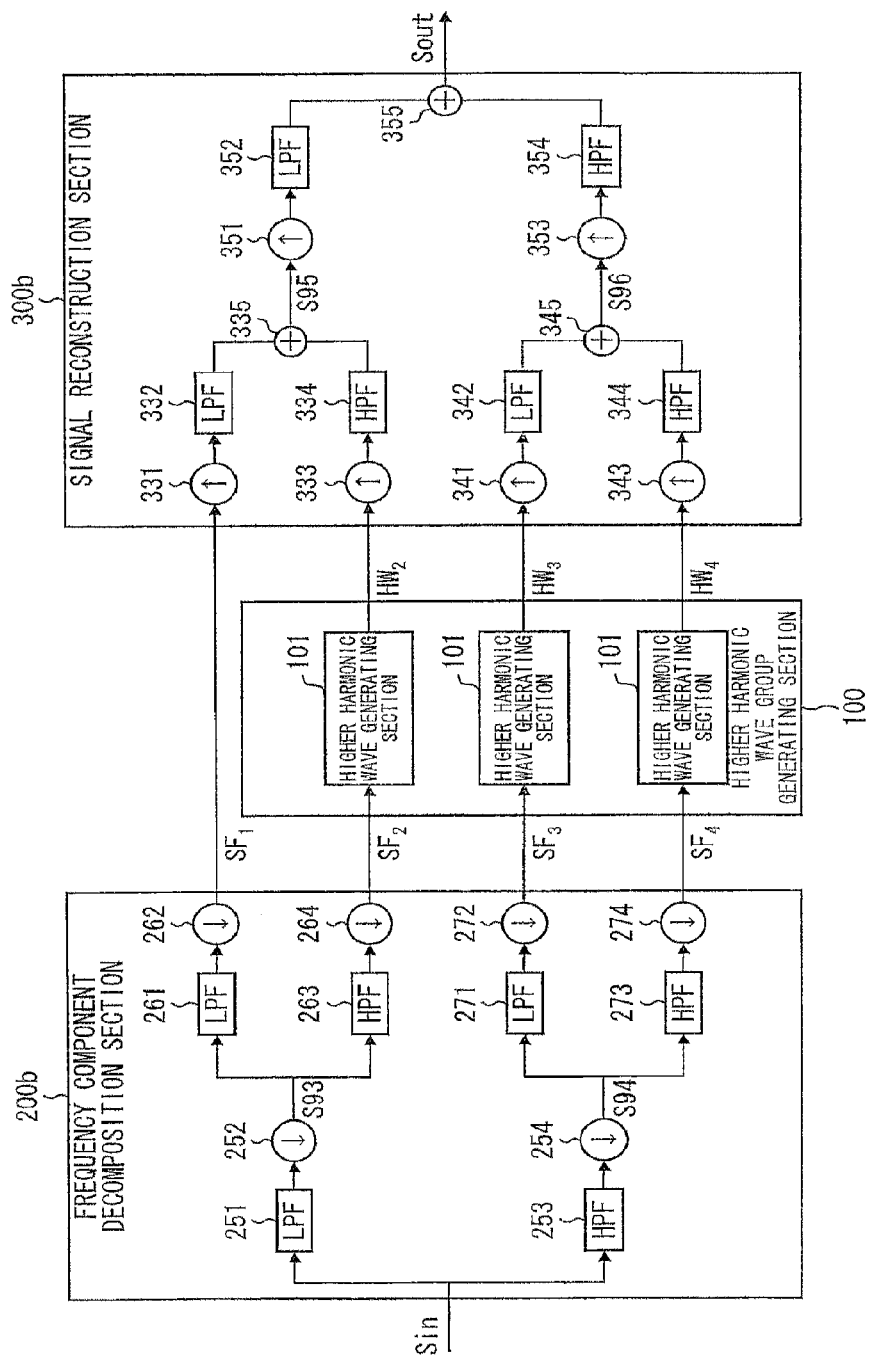
FIG. 3
Figure 15:
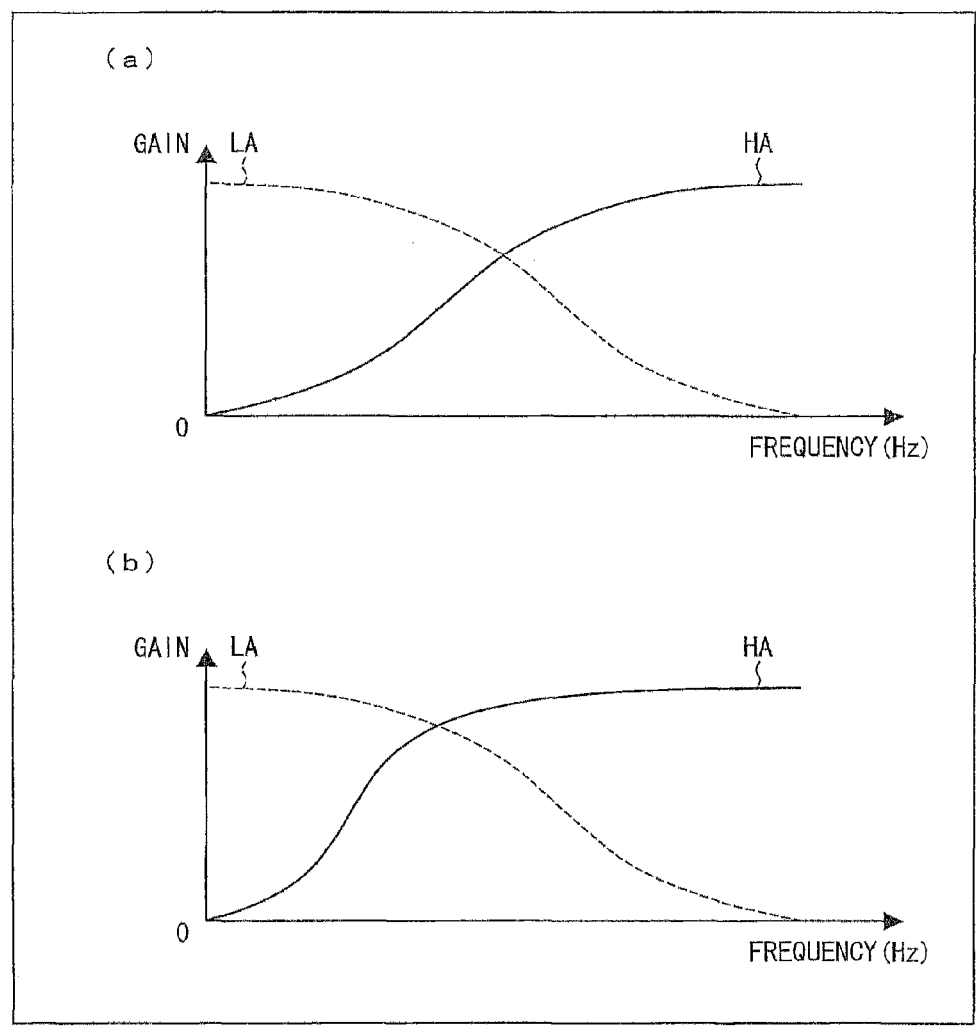

(a) of FIG. 15 schematically illustrates common frequency characteristics of a low pass filter and a high pass filter which are used in pairs in a wavelet transform and a wavelet inverse transform. (b) of FIG. 15 schematically illustrates frequency characteristics of a low pass filter and a high pass filter which are used in pairs in the wavelet transform and the wavelet inverse transform that are used by the frequency component decomposition section and the signal reconstruction section, respectively which are illustrated in FIG. 3.

FIG. 16

Figure 16:
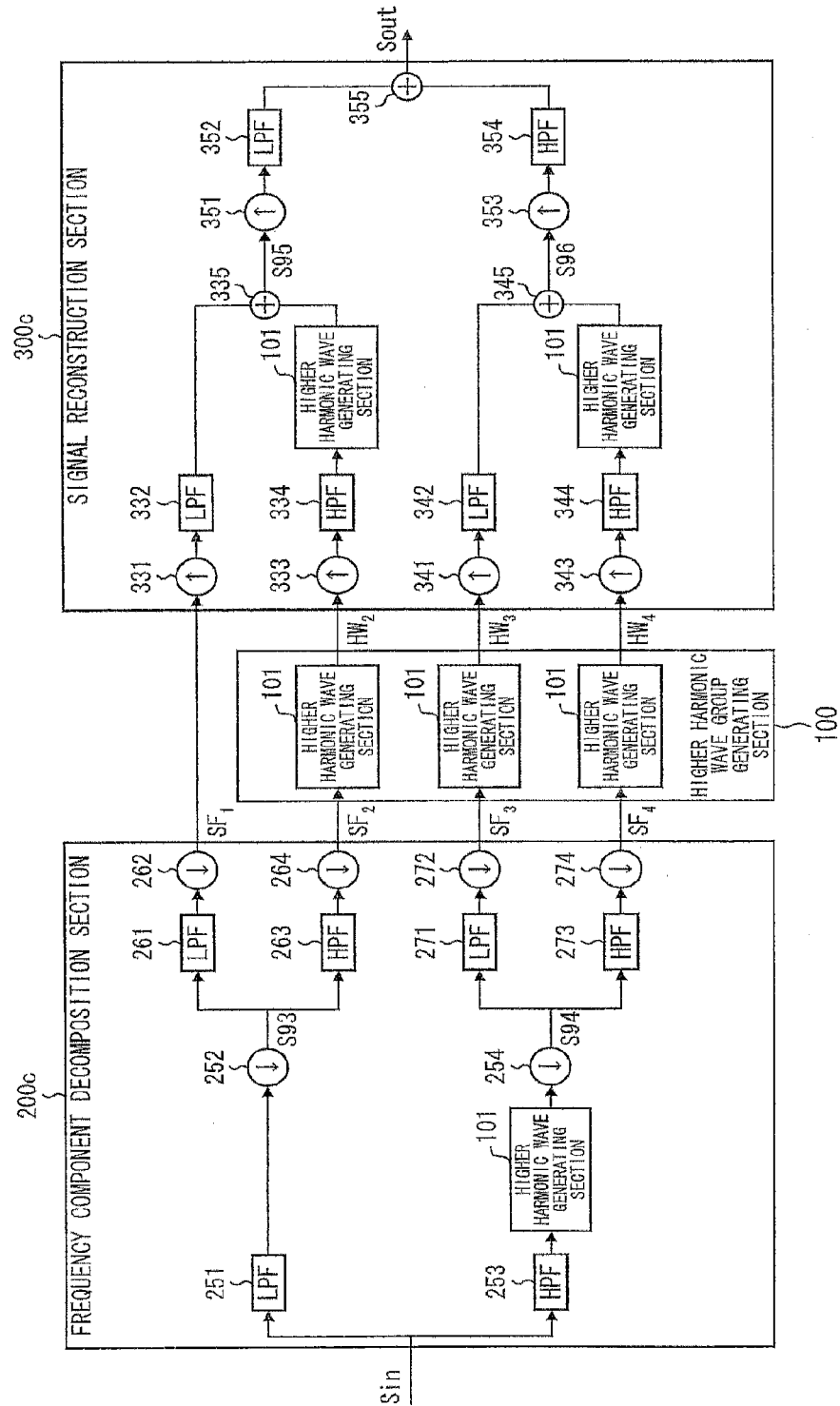

FIG. 16 is a block diagram illustrating a third arrangement of the frequency component decomposition section and the signal reconstruction section which are included in the signal processing device illustrated in FIG. 1.

FIG. 17

Figure 17:
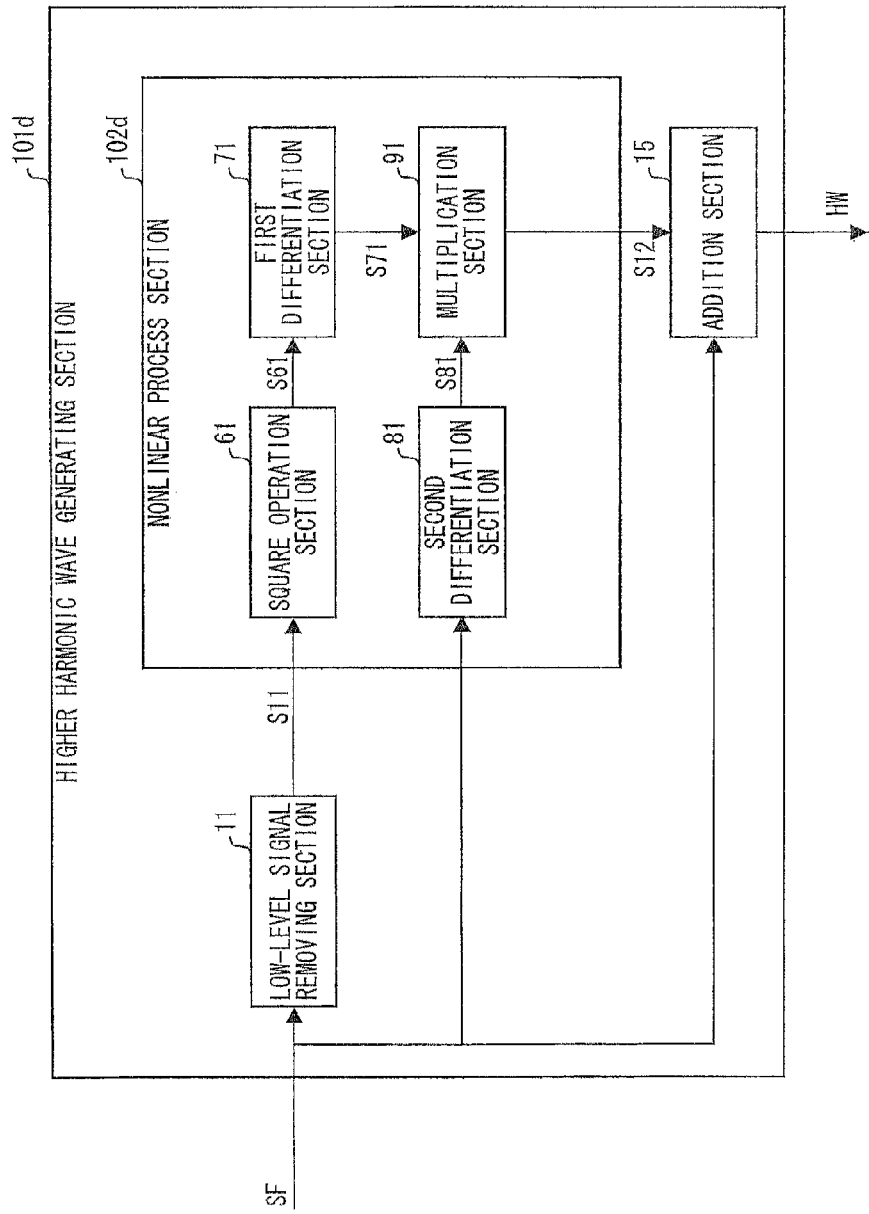

FIG. 17 is a block diagram illustrating a fourth arrangement of the higher harmonic wave generating section included in the signal processing device illustrated in FIG. 1.

FIG. 18

Figure 18:
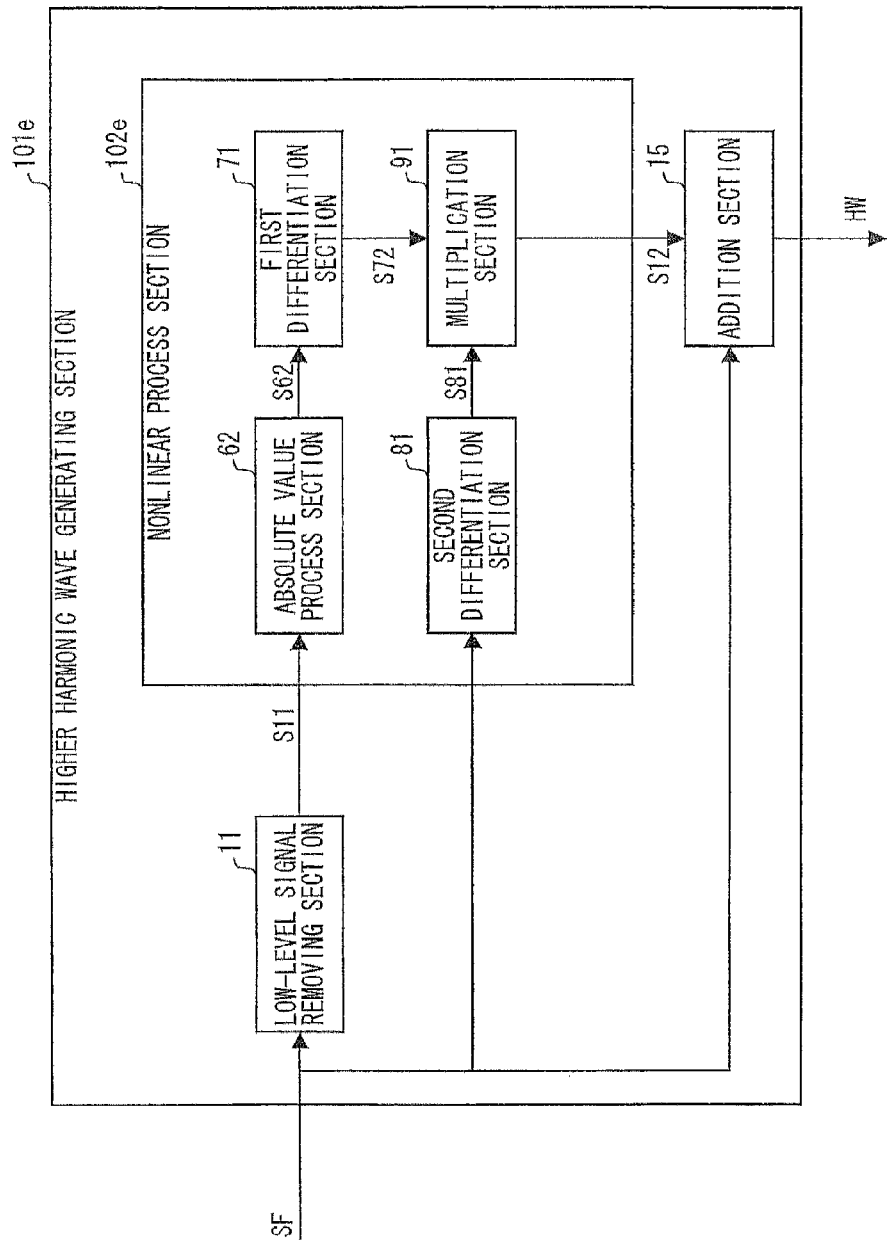

FIG. 18 is a block diagram illustrating a fifth arrangement of the higher harmonic wave generating section included in the signal processing device illustrated in FIG. 1.

FIG. 19

(a) of FIG. 19 is a schematic view illustrating a frequency spectrum of an image signal having a sampling frequency fs. (b) of FIG. 19 is a schematic view illustrating a frequency spectrum of an image signal obtained by carrying out the sharpening process by use of the conventional technique with respect to the image signal having the frequency spectrum illustrated in (a) of FIG. 19.

FIG. 20

Figure 20:
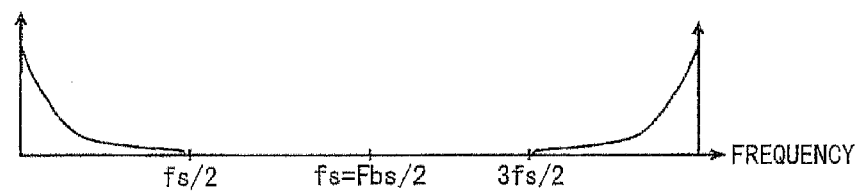

FIG. 20 is a schematic view illustrating a frequency spectrum of an image signal obtained by upconverting the image signal having the frequency spectrum illustrated in (a) of FIG. 19, so as to horizontally double the number of pixels.

DESCRIPTION OF EMBODIMENTS

An embodiment of the present invention is described below with reference to FIGS. 1 through 18.

(1. Summary of Signal Processing Device)

A signal processing device 500 in accordance with the present embodiment carries out, with respect to a digital signal which is supplied from outside and represents an image (hereinafter also referred to as an image signal), a sharpening process for sharpening the image, so as to output the sharpened image signal. Note here that the sharpening process refers to a process for steepening (enhancing) a rise and a fall of a signal which correspond to contour parts (edges) included in an image.

The following description describes an image signal to be supplied to the signal processing device 500 as an input signal Sin. The following description describes an image signal to be supplied from the signal processing device 500 as an output signal Sout.

Note that the signal processing device 500 can cause the output signal Sout to contain a high-frequency component which is not contained in the input signal Sin (a frequency component higher than a Nyquist frequency which is half of a sampling frequency that is used to discretize the input signal Sin) (described later). Therefore, a case where the sharpening process is carried out by the signal processing device 500 allows a rise and a fall of a signal which correspond to edges included in an image to be steeper as compared to a case where the sharpening process is carried out by use of a linear operation as in the case of the conventional technique.

Note that an image represented by the input signal Sin may be a static image or a moving image. Further, for example, a moving image may be displayed in real time in a receiver or the like of a standard definition television (SDTV) or a high definition television (HDTV).

The following description discusses the input signal Sin assuming that the input signal Sin is constituted by a data row (a series of pixel values) consisting of pixel values of pixels which are provided so as to be adjacent to each other in a horizontal direction (a lateral direction, a main scanning direction) of an image. Alternatively, the input signal Sin may be constituted by a data row consisting of pixel values of pixels which are provided so as to be adjacent to each other in a vertical direction (a perpendicular direction, a subscanning direction) of an image.

(2. Arrangement of the Signal Processing Device)

An arrangement of the signal processing device 500 is to be described with reference to FIG. 1. FIG. 1 is a block diagram illustrating an arrangement of the signal processing device 500.

The signal processing device 500 includes a frequency component decomposition section (frequency component decomposition means) 200, a higher harmonic wave group generating section 100, and a signal reconstruction section (output signal generating means) 300 (see FIG. 1). The higher harmonic wave group generating section 100 includes one or more higher harmonic wave generating sections (higher harmonic wave generating means) 101. Each of the one or more higher harmonic wave generating sections 101 includes at least a nonlinear process section (nonlinear process means) 102.

Note that, frequency component decomposition sections 200a through 200c (described later) which are not discriminated from one another are simply described as the "frequency component decomposition section 200". Signal reconstruction sections 300a through 300c (described later) which are not discriminated from one another are simply described as the "signal reconstruction section 300". Higher harmonic wave generating sections 101a through 101e (described later) which are not discriminated from one another are simply described as the "higher harmonic wave generating section 101". Nonlinear process sections 102a through 102e (described later) which are not discriminated from one another are simply described as the "nonlinear process section 102".

The signal processing device 500 which has received the input signal Sin from outside carries out the following processes (1) through (3), so as to output the output signal Sout.

(1) First, the signal processing device 500 causes the frequency component decomposition section 200 to decompose (analyzes) the input signal Sin into a plurality of frequency components $SF_i$ (i=1, 2, ..., m: m is an integer not less than 2) in different frequency ranges. An arrangement of the frequency component decomposition section 200 is described later.

Note that the input signal Sin may be decomposed into a plurality of frequency components in different frequency ranges by any method. For example, the input signal Sin may be decomposed into a plurality of frequency components in different frequency ranges by carrying out a so-called multi-resolution analysis. According to the multi-resolution analysis, an input signal is decomposed into a plurality of frequency components in different frequency ranges by consecutively carrying out a process for decomposing the input signal into a high-frequency component and a low-frequency component. The multi-resolution analysis, which is publicly known, is not described here.

The multi-resolution analysis may be carried out by any method. For example, a Laplacian pyramid algorithm or a wavelet transform may be used to carry out the multi-resolution analysis.

(2) Next, the signal processing device 500 causes the higher harmonic wave generating section 101 included in the higher harmonic wave group generating section 100 to carry out a nonlinear process with respect to each of a part or all of frequency components ($SF_n$ through $SF_m$: n is a positive integer not more than m) obtained by removing the lowest frequency component from frequency components into which the frequency component decomposition section 200 has decomposed, so as to generate a higher harmonic wave $HW_p$ (p=n, ..., m) having a high-frequency component which is not contained in the input signal Sin (a frequency component higher than a Nyquist frequency). It is not particularly limited for which of the frequency components into which the frequency component decomposition section 200 has decomposed the higher harmonic wave is to be generated. The higher harmonic wave may be generated for any of the frequency components into which the frequency component decomposition section 200 has decomposed.

Of the frequency components into which the frequency component decomposition section 200 has decomposed, each frequency component for which the higher harmonic wave is to be generated is provided with the higher harmonic wave generating section 101. The higher harmonic wave generating section 101 causes the nonlinear process section 102 to carry out the nonlinear process by use of, for example, a nonlinear function with respect to a frequency component which is supplied to the higher harmonic wave generating section 101 (described later). As a result, the higher harmonic wave generating section 101 generates the higher harmonic wave which contains a frequency component higher than a Nyquist frequency fs/2 which is half of a sampling frequency fs that is used to discretize a signal to be supplied to the higher harmonic wave generating section 101. An arrangement of the higher harmonic wave generating section 101 is described later.

(3) Subsequently, the signal processing device 500 causes the signal reconstruction section 300 to carry out a signal reconstruction in accordance with higher harmonic waves ($HW_n$ through $HW_m$) which have been generated by the higher harmonic wave group generating section 100 and frequency components ($SF_1$ through $SF_{n-1}$) which have not been subjected to the nonlinear process of the frequency components into which the frequency component decomposition section 200 has decomposed, so as to generate the output signal Sout.

Note that the signal reconstruction section 300 carries out a process (composition, synthesis) which is opposite to decomposition that is carried out by the frequency component decomposition section 200, so as to carry out the signal reconstruction (restoration). For example, in a case where the frequency component decomposition section 200 carries out the multi-resolution analysis by use of the wavelet transform, the signal reconstruction section 300 uses a wavelet inverse transform to carry out the signal reconstruction. An arrangement of the signal reconstruction section 300 is described later.

Note that FIG. 1 illustrates an arrangement such that the higher harmonic wave generating section 101 is provided for a part of the frequency components obtained by removing the lowest frequency component from the frequency components into which the frequency component decomposition section 200 has decomposed. In a case where the higher harmonic wave is generated for the part of the frequency components obtained by removing the lowest frequency component, an image represented by the output signal Sout becomes sharper than an image represented by the input signal Sin.

According to FIG. 1, the higher harmonic wave generating section 101 generates the higher harmonic wave for each of the frequency components $SF_n$ through $SF_m$. However, the higher harmonic wave generating section 101 may generate the higher harmonic wave for at least one of the frequency components $SF_n$ through $SF_m$. Also in this case, it is not particularly limited for which of the frequency components the higher harmonic wave is to be generated.

The higher harmonic wave may be generated for any of the frequency components.

(3. Arrangement of Frequency Component Decomposition Section and Signal Reconstruction Section)

Figure 2:
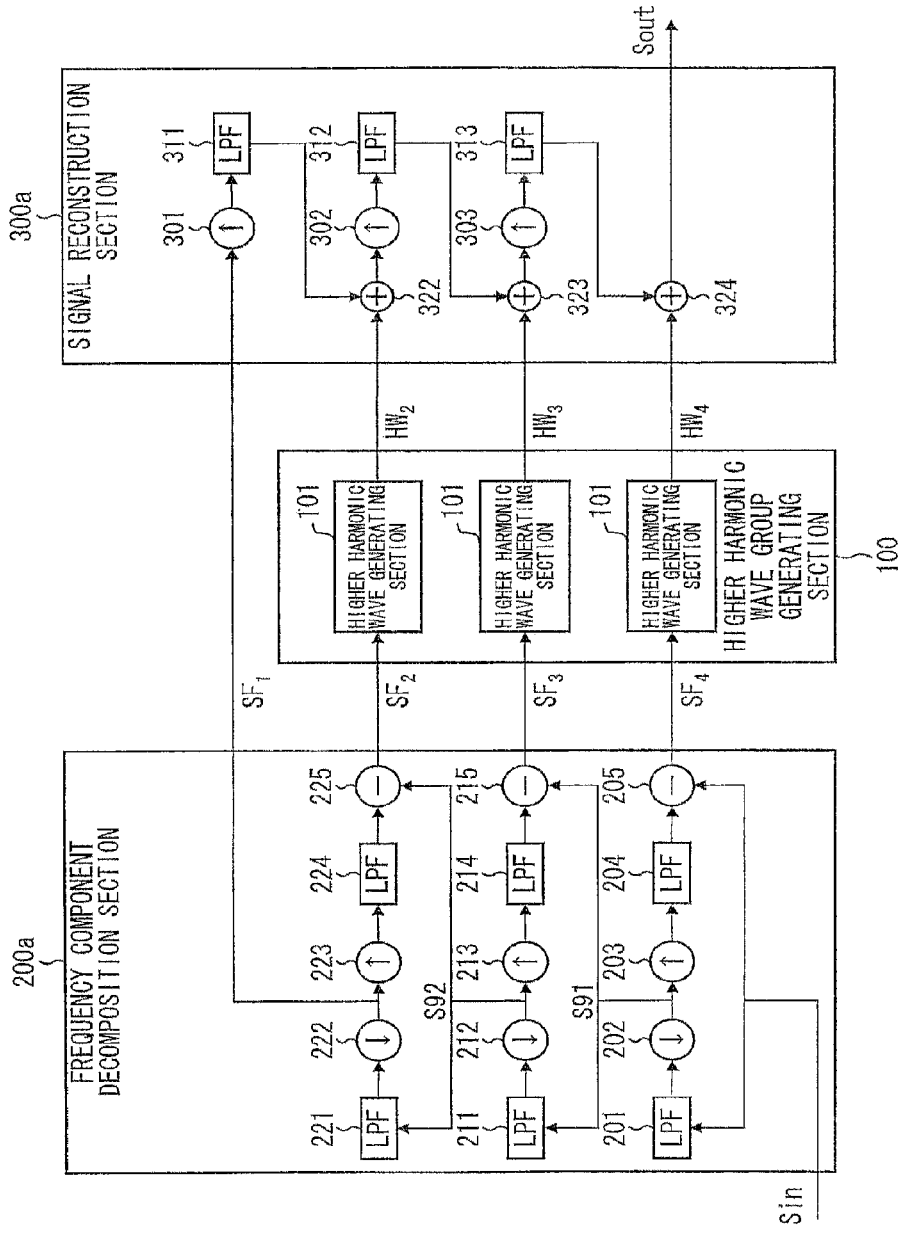
FIG. 2

The following description discusses an arrangement example of the frequency component decomposition section 200 and the signal reconstruction section 300 with reference to FIGS. 2 and 3. Note that an arrangement of the higher harmonic wave generating section 101 is not described here. The higher harmonic wave generating section 101 may be arranged in accordance with any of arrangement examples of the higher harmonic wave generating section 101 that are described later.

(3-1. Arrangement Example 1 of the Frequency Component Decomposition Section and the Signal Reconstruction Section)

First, the following description discusses an arrangement example of the frequency component decomposition section 200a and the signal reconstruction section 300a with reference to FIG. 2. The frequency component decomposition section 200a carries out the multi-resolution analysis by use of the Laplacian pyramid algorithm. The signal reconstruction section 300a carries out the signal reconstruction by use of the Laplacian pyramid algorithm. FIG. 2 is a block diagram illustrating an arrangement of the frequency component decomposition section 200a and the signal reconstruction section 300a.

Note that for convenience, a case where the input signal Sin is decomposed into four frequency ranges at three stages (ST1 through ST3) is described here. However, the number of stages and the number of frequency ranges obtained by the decomposition are appropriately determined in accordance with, for example, the number of pixels of an image represented by the input signal Sin.

FIG. 2 illustrates an example of decomposition into frequency components at three stages. As the number of stages increases, a lower frequency component can be used to cause an image to have a higher resolution. Assume here that a sampling frequency of a signal is 2fs, a Nyquist frequency is fs, a frequency component $SF_2$ ranges from fs/3 to fs/2, a frequency component $SF_3$ ranges from fs/2 to 2fs/3, and a frequency component $SF_4$ ranges from 2fs/3 to fs. In this case, according to the example illustrated in FIG. 2, a signal having a frequency component ranging from fs/3 to fs is used to cause an image to have a higher resolution. An increase in number of stages allows a signal to be controlled precisely by frequency. For example, a signal having a frequency component ranging from fs/3 to fs/2 can be controlled to be greatly amplified, and a signal having a frequency component ranging from 2fs/3 to fs can be controlled to be less greatly amplified since the signal having a frequency component ranging from 2fs/3 to fs is difficult to discriminate from noise. Commonly, an increase in number of stages allows a low-frequency signal to be used to cause an image to have a higher resolution. Note that, since the increase in number of stages allows more filters to be cascaded, a lower frequency signal can be detected.

Note that, in a case where a filter is arranged to have a longer tap length while the number of stages is reduced, it is possible to use a lower frequency signal to obtain a high-resolution image. However, a method for controlling a broad frequency range at an identical amplitude is not necessarily desirable in image creation. This is because such a method may cause a high definition component and noise to be amplified simultaneously.

The frequency component decomposition section 200a carries out the multi-resolution analysis by use of the Laplacian pyramid algorithm, so as to decompose the input signal Sin into frequency components $SF_1$ through $SF_4$ in four frequency ranges. At the first stage ST1, the frequency component decomposition section 200a first receives the input signal Sin, so as to obtain a frequency component S91 which is a low-frequency component and the frequency component $SF_4$ which is a high-frequency component. The frequency component S91 is obtained by causing a low pass filter (hereinafter described as an LPF) 201 to filter the input signal Sin and causing a downsampler 202 to downsample (decimate) the input signal Sin. The frequency component $SF_4$ is obtained by causing an upsampler 203 to upsample (interpolate) the frequency component S91, causing an LPF 204 to filter the frequency component S91, and causing a subtraction section 205 to subtract a result of the filtering by the LPF 204 from the input signal Sin.

Similarly, at the second stage ST2, the frequency component decomposition section 200a receives the frequency component S91, so as to cause an LPF 211, a downsampler 212, an upsampler 213, an LPF 214, and a subtraction section 215 to obtain a frequency component S92 which is a low-frequency component and the frequency component $SF_3$ which is a high-frequency component. Similarly, at the third stage ST3, the frequency component decomposition section 200a receives the frequency component S92, so as to cause an LPF 221, a downsampler 222, an upsampler 223, an LPF 224, and a subtraction section 225 to obtain the frequency component $SF_1$ which is a low-frequency component and the frequency component $SF_2$ which is a high-frequency component.

As described earlier, the frequency component decomposition section 200a carries out the multi-resolution analysis by use of the Laplacian pyramid algorithm, so as to decompose the input signal Sin into the frequency components $SF_1$ through $SF_4$.

Note that the higher harmonic wave generating section 101 carries out the nonlinear process with respect to each of the frequency components $SF_2$ through $SF_4$ obtained by removing the frequency component $SF_1$ which is the lowest frequency component from the frequency components into which the frequency component decomposition section 200a has decomposed, so as to generate the higher harmonic waves $HW_2$ through $HW_4$. However, as described above, it is not necessarily required that the higher harmonic wave generating section 101 carry out the nonlinear process with respect to each of the frequency components $SF_2$ through $SF_4$. It is only necessary that the higher harmonic wave generating section 101 carry out the nonlinear process with respect to at least one of the frequency components $SF_2$ through $SF_4$. Note that which of the frequency components $SF_2$ through $SF_4$ to select is not particularly limited and any of the frequency components $SF_2$ through $SF_4$ is selectable.

Next, the signal reconstruction section 300a uses the frequency component $SF_1$ and the higher harmonic waves $HW_2$ through $HW_4$ each of which has been generated by the higher harmonic wave generating section 101, so as to carry out the signal reconstruction by use of the Laplacian pyramid.

Specifically, the signal reconstruction section 300a first causes an upsampler 301 to upsample the frequency component $SF_1$ and causes an LPF 311 to filter the frequency component $SF_1$. Then, the signal reconstruction section 300a causes an addition section 322 to add a result of the filtering by the LPF 311 to the higher harmonic wave $HW_2$. Subsequently, the signal reconstruction section 300a causes an upsampler 302 to upsample a result of the addition by the addition section 322 and causes an LPF 312 to filter the result of the addition. Then, the signal reconstruction section 300a causes an addition section 323 to add a result of the filtering by the LPF 312 to the higher harmonic wave $HW_3$. Subsequently, the signal reconstruction section 300a causes an upsampler 303 to upsample a result of the addition by the addition section 323 and causes an LPF 313 to filter the result of the addition. Then, the signal reconstruction section 300a causes an addition section 324 to add a result of the filtering by the LPF 313 to the higher harmonic wave $HW_4$. The output signal Sout is thus obtained.

As described earlier, the signal reconstruction section 300a carries out the signal reconstruction by use of the Laplacian pyramid.

Note that since an LPF, a downsampler, and an upsampler which are included in the frequency component decomposition section 200a and/or the signal reconstruction section 300a may be publicly-known ones, arrangements thereof are not described here.

(3-2. Arrangement Example 2 of the Frequency Component Decomposition Section and the Signal Reconstruction Section)

Next, the following description discusses an arrangement example of the frequency component decomposition section 200 and the signal reconstruction section 300 with reference to FIG. 3. The frequency component decomposition section 200 carries out the multi-resolution analysis by use of the wavelet transform. The signal reconstruction section 300 carries out the signal reconstruction by use of the wavelet inverse transform. FIG. 3 is a block diagram illustrating an arrangement of the frequency component decomposition section 200b and the signal reconstruction section 300b.

Note that for convenience, a case of decomposition into four frequency ranges is described here. However, the number of the decomposition is appropriately determined in accordance with the number of pixels of an image represented by the input signal Sin. FIG. 3 illustrates a case where three signals (levels) are used (i.e., supplied to the higher harmonic wave group generating section 100) to cause an image to have a higher resolution. However, as the number of levels increases, a lower frequency component is used to cause an image to have a higher resolution. Assume that a sampling frequency of a signal is 2fs and a Nyquist frequency is fs. In a case where one level is used to cause an image to have a higher resolution (one signal is supplied to the higher harmonic wave generating section 100), a signal having a frequency ranging from fs/2 to fs is used. In a case where two levels are used to cause an image to have a higher resolution, signals having a frequency ranging from fs/4 to fs are used. In a case where three levels are used to cause an image to have a higher resolution, signals having a frequency ranging from fs/8 to fs are used.

The frequency component decomposition section 200b carries out the multi-resolution analysis by use of the wavelet transform, so as to decompose the input signal Sin into frequency components $SF_1$ through $SF_4$ in four frequency ranges (LL, LH, HL, and HH). The frequency component decomposition section 200b first causes an LPF 251 to receive the input signal Sin and causes a downsampler 252 to downsample the input signal Sin, so as to obtain a frequency component S93 which is a low-frequency component (L) (see FIG. 3). Similarly, the frequency component decomposition section 200b causes an HPF 253 to receive the input signal Sin and causes a downsampler 254 to downsample the input signal Sin, so as to obtain a frequency component S94 which is a high-frequency component (H).

Subsequently, the frequency component decomposition section 200b causes an LPF 261 to receive the frequency component S93 thus obtained and causes a downsampler 262 to downsample the frequency component S93, so as to obtain the frequency component $SF_1$ (a direct-current component) which is a low-frequency component of the low-frequency component (LL). The frequency component decomposition section 200b also causes an HPF 263 to receive the frequency component S93 thus obtained and causes a downsampler 264 to downsample the frequency component S93, so as to obtain the frequency component $SF_2$ which is a high-frequency component of the low-frequency component (LH).

In contrast, the frequency component decomposition section 200b causes an LPF 271 to receive the frequency component S94 thus obtained and causes a downsampler 272 to downsample the frequency component S94, so as to obtain the frequency component $SF_3$ which is a low-frequency component of the high-frequency component (HL). Similarly, the frequency component decomposition section 200b causes an HPF 273 to receive the frequency component S94 thus obtained and causes a downsampler 274 to downsample the frequency component S94, so as to obtain the frequency component $SF_4$ which is a high-frequency component of the high-frequency component (HH).

As described earlier, the frequency component decomposition section 200b carries out the multi-resolution analysis by use of the wavelet transform, so as to decompose the input signal Sin into the frequency components $SF_1$ through $SF_4$.

Note that the higher harmonic wave generating section 101 carries out the nonlinear process with respect to each of the frequency components $SF_2$ through $SF_4$ obtained by removing the frequency component $SF_1$ which is the lowest frequency component from the frequency components into which the frequency component decomposition section 200a has decomposed, so as to generate the higher harmonic waves $HW_2$ through $HW_4$. However, it is not necessarily required that the higher harmonic wave generating section 101 carry out the nonlinear process with respect to each of $SF_2$ through $SF_4$. It is only necessary that the higher harmonic wave generating section 101 carry out the nonlinear process with respect to at least one of $SF_2$ through $SF_4$.

Next, the signal reconstruction section 300b carries out the signal reconstruction by use of the wavelet inverse transform in accordance with the frequency component $SF_1$ and the higher harmonic waves $HW_2$ through $HW_4$ each of which has been generated by the higher harmonic wave generating section 101.

Specifically, the signal reconstruction section 300b first causes an upsampler 331 to upsample the frequency component $SF_1$, so as to cause an LPF 332 to receive a result of the upsampling by the upsampler 331. The signal reconstruction section 300b causes an upsampler 333 to upsample the $HW_2$, causes an HPF 334 to receive a result of the upsampling by the upsampler 333, and causes an addition section 335 to add outputs of the LPF 332 and the HPF 334, so as to obtain a frequency component S95 which is a low-frequency component (L).

The signal reconstruction section 300b causes an upsampler 341 to upsample the frequency component $HW_3$, so as to cause an LPF 342 to receive a result of the upsampling by the upsampler 341. The signal reconstruction section 300b causes an upsampler 343 to upsample the $HW_4$, causes an HPF 344 to receive a result of the upsampling by the upsampler 343, and causes an addition section 345 to add outputs of the LPF 342 and the HPF 344, so as to obtain a frequency component S96 which is a high-frequency component (H).

Then, the signal reconstruction section 300b causes an upsampler 351 to upsample the frequency component S95 thus obtained, so as to cause an LPF 352 to receive a result of the upsampling by the upsampler 351. The signal reconstruction section 300b causes an upsampler 353 to upsample the frequency component S96 thus obtained, causes an HPF 354 to receive a result of the upsampling by the upsampler 353, and causes an addition section 355 to add outputs of the LPF 352 and the HPF 354, so as to obtain the output signal Sout.

As described earlier, the signal reconstruction section 300b carries out the signal reconstruction by use of the wavelet inverse transform.

Note that since an LPF, an HPF, a downsampler, and an upsampler which are included in the frequency component decomposition section 200b and/or the signal reconstruction section 300b may be publicly-known ones, arrangements thereof are not described here.

(4. Arrangement Examples of Higher Harmonic Wave Generating Section)

The following description discusses arrangement examples of the higher harmonic wave generating section 101. An arrangement of the frequency component decomposition section 200 and the signal reconstruction section 300 is not described here. The frequency component decomposition section 200 and the signal reconstruction section 300 may be arranged in accordance with any of the arrangement examples described above.

Note that frequency components $SF_n$ through $SF_m$ which are not discriminated are simply described below as the "frequency component SF". Higher harmonic waves $HW_n$ through $HW_m$ which are not discriminated are simply described as the "higher harmonic wave HW".

(4-1. Arrangement Example 1 of the Higher Harmonic Wave Generating Section)

FIG. 4 is a block diagram illustrating an arrangement of the higher harmonic wave generating section 101a. The higher harmonic wave generating section 101a includes a low-level signal removing section (noise removing means) 11, the nonlinear process section 102a, and an addition section (addition means) 15 (see FIG. 4).

First, the low-level signal removing section 11 is to be described. The low-level signal removing section 11 is provided so that noise is not amplified in the nonlinear process section 102a at a subsequent stage. The low-level signal removing section 11 removes a low-level signal which is contained in the frequency component SF and can be regarded as noise, so as to generate a nonlinear process target signal S11. Specifically, the low-level signal removing section 11 changes, to "0", a signal value of the frequency component SF which signal value has an absolute value not more than a specific threshold (described as SV).

For example, in a case where the threshold SV is "3", the low-level signal removing section 11 changes, to "0", all signal values of the frequency component SF that have absolute values not more than "3". Note that it is desirable that the threshold SV be appropriately settable in accordance with a noise level.

Note that, in a case where it is unnecessary to remove a low-level signal of the frequency component SF, e.g., in a case where extremely few low-level signals such as noise are contained in the frequency component SF, the higher harmonic wave generating section 101a does not need to include the low-level signal removing section 11 and may include only the nonlinear process section 102a and the addition section 15. Note also that, in a case where the higher harmonic wave generating section 101a includes only the nonlinear process section 102a and the addition section 15, the frequency component SF is assumed as the nonlinear process target signal S11 as it is.

Next, the nonlinear process section 102a is to be described. The nonlinear process section 102a includes a nonlinear operation section (even exponentiation operation means) 21, a sign changing section (sign changing means) 41, and a limiter (amplitude adjustment means) 51 (see FIG. 4).

The nonlinear operation section 21 carries out nonlinear operation with respect to the nonlinear process target signal S11, so as to generate a nonlinear signal S21.

The nonlinear operation which is carried out by the nonlinear operation section 21 is described here. The following description denotes a signal value to be supplied to the nonlinear operation section 21 as x, denotes a signal value to be supplied from the nonlinear operation section 21 as y, and expresses the nonlinear operation which is carried out by the nonlinear operation section 21 as a function y=f (x).

Assume here that the function f (x) is a nonlinear monotone increasing function which monotonically increases so as to be in positive and negative symmetry (origin symmetry). Note that "monotone increasing" means broad monotone increasing. However, it is only necessary that the function f (x) monotonically increase at least in the vicinity of x="0". It is preferable that the function f (x) be $|f(x)|>|x|$ at least in the vicinity of x="0".

Such a function f (x) is exemplified by those expressed as the following expressions (1) through (3). Note that it is preferable that the functions f (x) expressed as the expressions (2) and (3) be used in an interval 0≤x≤1 since the functions f (x) greatly increase in the interval.

[Math. 1]
$$f(x)=x^{2n} \text{(n is a natural number)} \quad (1)$$

$$f(x)=|x|^{1/2} \quad (2)$$

[Math. 2]
[Math. 3]
In a case where the expression (1) is used as the $$f(x)=|x|^{1/10} \quad (3)$$

function f (x), the nonlinear operation section 21 raises the nonlinear process target signal S11 to an even exponent not less than 2, so as to generate the nonlinear signal S21 (an even exponentiation signal). For example, in a case where n=1 (i.e., $f(x)=x^2$) in the expression (1), the nonlinear operation section 21 squares the nonlinear process target signal S11, so as to generate the nonlinear signal S21. Assuming in this case that data rows constituting the nonlinear process target signal S11 are X1, X2, X3, . . . , the nonlinear signal S21 obtained by squaring the nonlinear process target signal S11 becomes a digital signal constituted by data rows $X1^2$, $X2^2$, and $X3^2$, . . . .

In a case where a signal value of the nonlinear process target signal S11 is any of integer values −255 through 255, 255 may be used to normalize x so as to use the function (x). For example, the expression (2) may be replaced with the following expression (4) obtained by using x/255 to normalize x on the right side of the function f (x) expressed as the expression (2) and multiplying the right side by 255. Note that the expression (4) meets the requirement of f (x)>x.

$$f(x)=255|x/255|^{1/2} \quad (4)$$

[Math. 4]

In the expression (4), 255 is used to normalize x on the right side of the function f (x) expressed as the expression (2) and the right side is multiplied by 255. However, a numerical value by which the right side is multiplied does not need to be identical to a value (255 in this example) to normalize x. It is only necessary that the numerical value meet the requirement of |f (x)|>|x=1. For example, the following expression (5) in which the right side is multiplied by 100 instead of 255 may be replaced with the expression (4).

$$f(x)=100|x/255|^{1/2} \quad (5)$$

[Math. 5]

Further, the function (x) may be expressed as the following expression (6) and use a trigonometric function.

[Math. 6]

$$f(x)=255|\sin[(x/255)(\pi/2)]| \quad (6)$$

Subsequently, in accordance with sign bit information on the nonlinear process target signal S11, the sign changing section 41 generates, as a sign change signal S41, a signal obtained by reflecting a sign of the nonlinear process target signal S11 in the nonlinear signal S21. Namely, the sign changing section 41 retains a sign of a part of the nonlinear signal S21 which part is identical in sign to the nonlinear process target signal S11. In contrast, the sign changing section 41 reverses positive and negative signs of a part of the nonlinear signal S21 which part is different in sign from the nonlinear process target signal S11.

Then, the limiter 51 carries out a process (hereinafter also described as an amplitude adjustment process) for adjusting an amplitude (a signal level, an intensity) of the sign change signal S41 which is generated by the sign changing section 41, so as to generate a nonlinear process signal S12, Specifically, the limiter 51 multiplies the sign change signal S41 by a specific multiplying factor (described as α) (|α|<1), so as to adjust the amplitude of the sign change signal S41.

Note that it is desirable that the multiplying factor α be appropriately settable in accordance with a movement of a video and/or a noise level. In a case where the multiplying factor α is fixed, it is desirable that the multiplying factor α be set to a value whose absolute value is not more than 0.5, for example.

In order not to further amplify a signal which has sufficient energy and in order to cause a signal value of the nonlinear process signal S12 to be not more than a specific upper limit value (described as UV), the limiter 51 carries out a process (hereinafter also described as a clip process) for changing, to a value not more than the upper limit value UV, an absolute value of a part of the nonlinear process signal S12 which part has an absolute value higher than the upper limit value UV. For example, in a case where a part of the nonlinear process signal S12 has a signal value whose absolute value exceeds "64", the limiter 51 changes the signal value to "64" or "−64" in accordance with a sign of the absolute value. Alternatively, the limiter 51 changes the absolute value to "0".

Note that it is desirable that the upper limit value UV be appropriately settable in accordance with a movement of a video and/or a noise level. In a case where the upper limit value UV is fixed, it is desirable that the upper limit value UV be set to a value not more than 64 with respect to an image represented by an 8-bit signal, for example.

Note that the nonlinear process section 102a may include no limiter 51 that carries out the amplitude adjustment process and the clip process with respect to the sign change signal S41. In this case, the nonlinear process section 102a outputs, as the nonlinear process signal S12, the sign change signal S41 which is generated by the sign changing section 41.

Finally, the addition section 15 is to be described. The addition section 15 uses the nonlinear process signal S12 as a correction signal and adds the nonlinear process signal S12 to the frequency component SF, so as to generate the higher harmonic wave HW. Note that the addition section 15 appropriately includes a delay element for adjusting a timing between the frequency component SF and the nonlinear process signal S12.

(4-2. Waveform of Signal)

The following description discusses waveforms of signals generated by sections of the higher harmonic wave generating section 101a with reference to (a) of FIG. 5 through (e) of FIG. 5. (a) of FIG. 5 through (e) of FIG. 5 schematically illustrate the waveforms of the signals generated by the sections of the higher harmonic wave generating section 101a. Assume here that the higher harmonic wave generating section 101a receives the signal (see (a) of FIG. 5) as the frequency component SF.

First, the low-level signal removing section 11 which has received the frequency component SF removes a low-level signal such as noise, so as to generate the nonlinear process target signal S11 (see (b) of FIG. 5).

Next, in a case where the nonlinear operation which is carried out by the nonlinear operation section 21 is $f(x)=x^2$, the nonlinear operation section 21 generates the nonlinear signal S21 obtained by squaring the nonlinear process target signal S11 (see (c) of FIG. 5).

Subsequently, the sign changing section 41 which has received the nonlinear signal S21 generates the sign change signal 41 (see (d) of FIG. 5). As illustrated in (d) of FIG. 5, the sign change signal S41 retains positive and negative signs of the nonlinear process target signal S11 (see (b) of FIG. 5).

Then, the limiter 51 which has received the sign change signal S41 carries out the amplitude adjustment process and the clip process, so as to generate the nonlinear process signal S12. Thereafter, the addition section 15 adds the nonlinear process signal S12 to the frequency component SF, so as to generate the higher harmonic wave HW (see (e) of FIG. 5). A comparison between the signal (see (a) of FIG. 5) and the higher harmonic wave (see (e) of FIG. 5) reveals that an edge of the higher harmonic wave (see (e) of FIG. 5) rises more steeply than that of the signal (see (a) of FIG. 5). This shows that a resolution of an image has been enhanced.

Note that a rise and a fall of the signal of the higher harmonic wave HW (see (e) of FIG. 5), which are steeper than those of a signal obtained by enhancing the frequency component SF by use of the linear operation as in the case of the conventional technique, are to be described with reference to FIG. 6.

The signal (see (a) of FIG. 6) is identical to the signal of the frequency component SF (see (a) of FIG. 5). In order to enhance the frequency component SF (see (a) of FIG. 6), a conventional sharpening process using the linear operation uses a method in which a high-frequency signal is extracted from the frequency component SF (see (a) of FIG. 6) and the frequency component SF is added to the high-frequency signal thus extracted. Therefore, a signal component which is not contained in the frequency component SF and exceeds the Nyquist frequency is not added to an image signal in the conventional sharpening process using the linear operation.

Therefore, the signal (see (b) of FIG. 6) is generated in the conventional sharpening process using the linear operation. Though a rise and a fall of the signal (see (b) of FIG. 6) are steeper than those of the signal of the frequency component SF (see (a) of FIG. 6), the rise and the fall of the signal of the higher harmonic wave HW (see (e) of FIG. 5) generated by the higher harmonic wave generating section 101a are steeper.

A comparison between the signal (see (a) of FIG. 6) and the signal (see (b) of FIG. 6) reveals that their edges rise at a substantially identical angle. In the signal (see (b) of FIG. 6), a valley is added before the edge rises and a valley is added after the edge rises. Accordingly, a pattern of an image represented by the signal (see (b) of FIG. 6) seems to be bordered. As described earlier, the conventional sharpening process which uses no signal component that exceeds the Nyquist frequency allows enhancement of a sense of resolution of an image only by bordering. Therefore, differently from the present invention, the conventional sharpening process does not allow enhancement of a resolution itself of an image.

(4-3. Arrangement Example 2 of the Higher Harmonic Wave Generating Section)

The nonlinear process section 102a of the higher harmonic wave generating section 101a may differentiate the nonlinear signal S21 which is generated by the nonlinear operation section 21. This is because differentiation of the nonlinear signal S21 allows removal of a direct-current component contained in the nonlinear operation section 21.

Therefore, an arrangement example of the higher harmonic wave generating section 101b is to be described with reference to FIG. 7. FIG. 7 is a block diagram illustrating an arrangement of the higher harmonic wave generating section 101b.

The higher harmonic wave generating section 101b includes the low-level signal removing section 11, the nonlinear process section 102b, and the addition section 15 (see FIG. 7). The nonlinear section 102b is obtained by causing the nonlinear section 102a to further include a differentiation section (differentiation means) 31 which is provided between the nonlinear operation section 21 and the sign changing section 41. Since the low-level signal removing section 11, members of the nonlinear process section 102b other than the differentiation section 31, and the addition section 15 are identical to those described above, a specific description thereof is omitted here.

Note that, in a case where it is unnecessary to remove a low-level signal of the frequency component SF, e.g., in a case where extremely few low-level signals such as noise are contained in the frequency component SF, the higher harmonic wave generating section 101*b* does not need to include the low-level signal removing section 11 and may include only the nonlinear process section 102*b* and the addition section 15. In a case where the higher harmonic wave generating section 101*b* includes only the nonlinear process section 102*b* and the addition section 15, the frequency component SF is assumed as the nonlinear process target signal S11 as it is.

The differentiation section 31 differentiates the nonlinear signal S21 which is generated by the nonlinear operation section 21, so as to generate a differential signal S31.

An arrangement of the differentiation section 31 is to be described with reference to FIG. 8. FIG. 8 is a block diagram illustrating the arrangement of the differentiation section 31. The differentiation section 31 includes a unit delay element 3111 and a subtraction section 3112. The differentiation section 31 finds a backward difference with respect to a signal to be supplied to the differentiation section 31.

With respect to the differential signal S31 which has been generated by the differentiation section 31, in accordance with sign bit information on the nonlinear process target signal S11, the sign changing section 41 generates, as a sign change signal S42, a signal obtained by reflecting a sign of the nonlinear process target signal S11 in the nonlinear signal S21. Namely, the sign changing section 41 retains a sign of a part of the differential signal S31 which part is identical in sign to the nonlinear process target signal S11. In contrast, the sign changing section 41 reverses positive and negative signs of a part of the differential signal S31 which part is different in sign from the nonlinear process target signal S11.

The limiter 51 carries out the amplitude adjustment process and the clip process with respect to the sign change signal S42 which is generated by the sign changing section 41, so as to generate the nonlinear process signal S12. According to the amplitude adjustment process, the sign change signal S42 is multiplied by the specific multiplying factor α, so that an amplitude of the sign change signal S42 is adjusted.

Note that the nonlinear process section 102*b* may include no limiter 51 that carries out the amplitude adjustment process and the clip process with respect to the sign change signal S42. In this case, the nonlinear process section 102*b* outputs, as the nonlinear process signal S12, the sign change signal S42 which is generated by the sign changing section 41.

(4-4. Waveform of Signal)

The following description discusses waveforms of signals generated by sections of the higher harmonic wave generating section 101*b* with reference to (a) of FIG. 9 through (f) of FIG. 9. (a) of FIG. 9 through (f) of FIG. 9 schematically illustrate the waveforms of the signals generated by the sections of the higher harmonic wave generating section 101*b*.

Assume here that the higher harmonic wave generating section 101*b* receives the signal (see (a) of FIG. 9) as the frequency component SF. Note that the signal (see (a) of FIG. 9) is identical to the signal (see (a) of FIG. 5).

First, the low-level signal removing section 11 which has received the frequency component SF removes a low-level signal such as noise, so as to generate the nonlinear process target signal S11 (see (b) of FIG. 9).

Next, in a case where the nonlinear operation which is carried out by the nonlinear operation section 21 is $f(x)=x^2$, the nonlinear operation section 21 generates the nonlinear signal S21 obtained by squaring the nonlinear process target signal S11 (see (c) of FIG. 9).

Subsequently, the differentiation section 31 which has received the nonlinear signal S21 generates the differential signal S31 (see (d) of FIG. 9). Note that the direct-current component contained in the nonlinear operation section 21 has been removed in the differential signal S31.

Then, the sign changing section 41 which has received the differential signal S31 generates the sign change signal 42 (see (e) of FIG. 9). As illustrated in (e) of FIG. 9, the sign change signal S42 retains positive and negative signs of the nonlinear process target signal S11 (see (b) of FIG. 9).

Next, the limiter 51 which has received the sign change signal S42 carries out the amplitude adjustment process and the clip process, so as to generate the nonlinear process signal S12. Thereafter, the addition section 15 adds the nonlinear process signal S12 to the frequency component SF, so as to generate the higher harmonic wave HW (see (f) of FIG. 9).

Note that a rise and a fall of the signal of the higher harmonic wave HW (see (f) of FIG. 9) are steeper than those of a signal obtained by sharpening an image signal by use of the linear operation.

(4-5. Arrangement Example 3 of the Higher Harmonic Wave Generating Section)

Each of the higher harmonic wave generating section 101*a* and the higher harmonic wave generating section 101*b* (which are described above) includes the sign changing section 41. However, each of the higher harmonic wave generating section 101*a* and the higher harmonic wave generating section 101*b* does not need to include the sign changing section 41 provided that the nonlinear operation is carried out with respect to the nonlinear process target signal S11 so as to retain positive and negative signs of the nonlinear process target signal S11.

Therefore, an arrangement example of the higher harmonic wave generating section 101*c* which includes no sign changing section 41 is to be described with reference to FIG. 10. FIG. 10 is a block diagram illustrating an arrangement of the higher harmonic wave generating section 101*c*.

The higher harmonic wave generating section 101*c* includes the low-level signal removing section 11, the nonlinear process section 102*c*, and the addition section 15 (see FIG. 10). The nonlinear section 102*c* further includes a nonlinear operation section (odd exponentiation operation means) 22 and the limiter 51. Since the low-level signal removing section 11, the limiter 51, and the addition section are identical to those described above, a specific description thereof is omitted here.

Note that, in a case where it is unnecessary to remove a low-level signal of the frequency component SF, e.g., in a case where extremely few low-level signals such as noise are contained in the frequency component SF, the higher harmonic wave generating section 101*c* does not need to include the low-level signal removing section 11 and may include only the nonlinear process section 102*c* and the addition section 15. Note also that, in a case where the higher harmonic wave generating section 101*c* includes only the nonlinear process section 102*c* and the addition section 15, the frequency component SF is assumed as the nonlinear process target signal S11 as it is.

The nonlinear operation section 22 carries out a nonlinear operation with respect to the nonlinear process target signal S11, so as to generate a nonlinear signal S22.

The nonlinear operation which is carried out by the nonlinear operation section 22 is described here. The following description denotes a signal value to be supplied to the nonlinear operation section 22 as x, denotes a signal value to be supplied from the nonlinear operation section 22 as y, and expresses the nonlinear operation which is carried out by the nonlinear operation section 22 as a function $y=g(x)$.

Assume here that the function $g(x)$ is a nonlinear monotone increasing function which monotonically increases so as to be in positive and negative symmetry (origin symmetry). Note that "monotone increasing" means broad monotone increasing. However, it is only necessary that the function g (x) monotonically increase at least in the vicinity of x="0". It is preferable that the function g (x) be |g (x)|>|x| at least in the vicinity of x="0".

Such a function g (x) is exemplified by that expressed as the following expression (7).
[Math. 7]

$$g(x) = X^{3n} \text{ (n is a natural number)} \quad (7)$$

In a case where the expression (7) is used as the function g (x), the nonlinear operation section 22 raises the nonlinear process target signal S11 to an odd exponent not less than 3, so as to generate the nonlinear signal S22. For example, in a case where n=1 (i.e., g (x)=$x^3$) in the expression (7), the nonlinear operation section 22 cubes the nonlinear process target signal S11, so as to generate the nonlinear signal S22. Assuming in this case that data rows constituting the nonlinear process target signal S11 are X1, X2, X3, . . . , the nonlinear signal S22 obtained by cubing the nonlinear process target signal S11 becomes a digital signal constituted by data rows $X1^3$, $X2^3$, and $X3^3$, . . . .

The limiter 51 carries out the amplitude adjustment process and the clip process with respect to the nonlinear signal S22 which is generated by the nonlinear operation section 22, so as to generate the nonlinear process signal S12.

Note that the nonlinear process section 102c may include no limiter 51 that carries out the amplitude adjustment process and the clip process with respect to the nonlinear signal S22. In this case, the nonlinear process section 102c outputs, as the nonlinear process signal S12, the nonlinear signal S22 which is generated by nonlinear operation section 22.

(4-6. Waveform of Signal)

The following description discusses waveforms of signals generated by sections of the higher harmonic wave generating section 101c with reference to (a) of FIG. 11 through (d) of FIG. 11. (a) of FIG. 11 through (d) of FIG. 11 schematically illustrate the waveforms of the signals generated by the sections of the higher harmonic wave generating section 101c.

Assume here that the higher harmonic wave generating section 101c receives the signal (see (a) of FIG. 11) as the frequency component SF. Note that the signal (see (a) of FIG. 11) is identical to the signal (see (a) of FIG. 5).

First, the low-level signal removing section 11 which has received the frequency component SF removes a low-level signal such as noise, so as to generate the nonlinear process target signal S11 (see (b) of FIG. 11).

Next, in a case where the nonlinear operation which is carried out by the nonlinear operation section 22 is g (x)=$x^3$, the nonlinear operation section 22 generates the nonlinear signal S22 obtained by cubing the nonlinear process target signal S11 (see (c) of FIG. 11).

Next, the limiter 51 which has received the nonlinear signal S22 carries out the amplitude adjustment process and the clip process, so as to generate the nonlinear process signal S12. Thereafter, the addition section 15 adds the nonlinear process signal S12 to the frequency component SF, so as to generate the higher harmonic wave HW (see (d) of FIG. 11).

Note that a rise and a fall of the signal of the higher harmonic wave HW (see (d) of FIG. 11) are steeper than those of a signal obtained by sharpening an image signal by use of the linear operation.

(4-7. Reason Why Frequency Exceeding Nyquist Frequency is Generated)

The following description discusses the reason why the higher harmonic wave HW which is generated by the higher harmonic wave generating section 101 contains a high-frequency component which exceeds the Nyquist frequency fs/2 such as a harmonic component contained in the input signal Sin.

Assume here that the input signal Sin is expressed as a function F (x) in which a position (in a horizontal direction of an image) is x. In a case where a base angular frequency of the input signal Sin is ω, the function F (x) can be expressed by use of a Fourier series (see the following expression (8)).

[Math. 8]

$$F(x) = a_{-N}\cos(-N)\omega x + a_{-N+1}\cos(-N+1)\omega x + \quad (8)$$
$$\ldots + a_{-1}\cos(-1)\omega x + a_0 + a_1\cos\omega x + a_2\cos 2\omega x + \ldots +$$
$$a_N\cos N\omega x + b_{-N}\sin(-N)\omega x + b_{-N+1}\sin(-N+1)\omega x + \ldots +$$
$$b_{-1}\sin(-1)\omega x + b_1\sin\omega x + b_2\sin 2\omega x + \ldots + b_N\sin N\omega x$$

In the expression (8), N is a degree of a higher harmonic wave having a maximum frequency which does not exceed the Nyquist frequency fs/2 with respect to the sampling frequency fs. Namely, the following expression (9) is met.
[Math. 9]

$$N\omega/(2\pi) \leq fs/2 \leq (N+1)\omega/(2\pi) \quad (9)$$

Next, in a case where a signal of the input signal Sin expressed as the function F (x) other than a direct-current component $a_0$ is denoted as G (x), G (x) is expressed as the following expression (10).

[Math. 10]

$$G(x) = a_{-N}\cos(-N)\omega x + a_{-N+1}\cos(-N+1)\omega x + \quad (10)$$
$$\ldots + a_{-1}\cos(-1)\omega x + a_1\cos\omega x + a_2\cos 2\omega x + \ldots +$$
$$a_N\cos N\omega x + b_{-N}\sin(-N)\omega x + b_{-N+1}\sin(-N+1)\omega x + \ldots +$$
$$b_{-1}\sin(-1)\omega x + b_1\sin\omega x + b_2\sin 2\omega x + \ldots + b_N\sin N\omega x$$

Note here that the frequency component SF to be supplied to the higher harmonic wave generating section 101 contains the signal G (x) or a high-frequency component of the signal G (x).

For example, in a case where the nonlinear operation section 21 carries out the nonlinear operation of f (x)=$x^2$, the nonlinear operation section 21 generates the nonlinear signal S21 by squaring the nonlinear process target signal S11. Note here that each term of $(G (x))^2$ is expressed as any of the following expressions (11) through (13) based on the expression (10) (i=±1, ±2, . . . , ±N; j=±1, ±2, . . . , ±N).
[Math. 11]

$$a_i \cos i\omega x \cdot a_j \cos j\omega x \quad (11)$$

[Math. 12]

$$a_i \cos i\omega x \cdot b_j \sin j\omega x \quad (12)$$

[Math. 13]

$$b_i \sin i\omega x \cdot b_j \sin j\omega x \quad (13)$$

Note here that the expressions (11) through (13) can be rewritten to the following respective expressions (14) through (16) by use of trigonometric formulae.
[Math. 14]

$$(a_i a_j/2)\{\cos(i+j)\omega x + \cos(i-j)\omega x\} \quad (14)$$

[Math. 15]

$$(a_i b_j/2)\{\sin(i+j)\omega x - \sin(i-j)\omega x\} \quad (15)$$

[Math. 16]

$$(-b_ib_j/2)\{\cos(i+j)\omega x - \cos(i-j)\omega x\} \quad (16)$$

$(G(x))^2$ contains angular frequency components such as $(N+1)\omega$, $(N+2)\omega$, ..., and $2N\omega$ (see the expressions (14) through (16)).

Accordingly, $(G(x))^2$ contains a frequency component which is higher than the Nyquist frequency fs/2. Namely, the nonlinear signal S21 which is generated by the nonlinear operation section 21 contains a frequency component which is higher than the Nyquist frequency fs/2 such as a harmonic component having a frequency of $2N\omega/(2\pi)$.

Similarly, for example, in a case where the nonlinear operation section 22 carries out the nonlinear operation of $g(x)=x^3$, the nonlinear operation section 22 generates the nonlinear signal S22 by cubing the nonlinear process target signal S11. Note here that each term of $(G(x))^3$ is expressed as any of the following expressions (17) through (20) based on the expression (10) ($i=\pm 1, \pm 2, \ldots, \pm N$; $j=\pm 1, \pm 2, \ldots, \pm N$).

$$a_i \cos i\omega x \cdot a_j \cos j\omega x \cdot a_k \cos k\omega x \quad (17)$$

[Math. 17]
[Math. 18]
[Math. 19]

$$a_i \cos i\omega x \cdot a_j \cos j\omega x \cdot b_k \sin \omega x \quad (18)$$

$$a_i \cos i\omega x \cdot b_j \sin j\omega x \cdot b_k \sin k\omega x \quad (19)$$

[Math. 20]

$$b_i \sin i\omega x \cdot b_j \sin j\omega x \cdot b_k \sin k\omega x \quad (20)$$

Note here that, in a case where attention is paid to terms in which $i=j=k=N$ and which are expressed as the expressions (17) and (20), these terms can be rewritten to the following respective expressions (21) and (22) by use of trigonometric formulae.

[Math. 21]

$$(a_N \cos N\omega x)^3 = a_N^3 \{(3/4)\cos N\omega x + (1/4)\cos 3N\omega x\} \quad (21)$$

[Math. 22]

$$(b_N \sin N\omega x)^3 = b_N^3 \{(3/4)\cos N\omega x - (1/4)\sin 3N\omega x\} \quad (22)$$

For example, in a case where attention is paid to terms in which $i=j=k=-N$ and which are expressed as the expressions (17) and (20), these terms can be rewritten to the following respective expressions (23) and (24) by use of trigonometric formulae.

[Math. 23]

$$\{a_N \cos(-N\omega x)\}^3 = a_N^3 \{(3/4)\cos(-N\omega x) + (1/4)\cos(-3N\omega x)\} \quad (23)$$

[Math. 24]

$$\{b_N \sin(-N\omega x)\}^3 = b_N^3 \{(3/4)\sin(-N\omega x) - (1/4)\sin(-3N\omega x)\} \quad (24)$$

$(G(x))^3$ contains a frequency component which is 3N times a base angular frequency $\omega$ and a frequency component which is $-3N$ times the base angular frequency $\omega$ (see the expressions (21) through (24)). The expressions (21) through (24) show that, in a case where the other terms of $(G(x))^3$ are rewritten by use of trigonometric formulae, $(G(x))^3$ contains various frequency components which range from 3N times to $-3N$ times the base angular frequency $\omega$.

Accordingly, $(G(x))^3$ contains a frequency component which is higher than the Nyquist frequency fs/2. Namely, the nonlinear signal S22 which is generated by the nonlinear operation section 22 contains a frequency component which is higher than the Nyquist frequency fs/2 such as a harmonic component having a frequency of $3N\omega/(2\pi)$.

Accordingly, the higher harmonic wave HW which is generated by the higher harmonic wave generating section 101 contains a high-frequency component which is not contained in the frequency component SF, i.e., a frequency component which is higher than the Nyquist frequency.

Therefore, the output signal Sout which has been reconstructed by the signal reconstruction section 300 by use of the higher harmonic wave HW which is generated by the higher harmonic wave generating section 101 contains a high-frequency component which is not contained in the input signal Sin, i.e., a frequency component which is higher than the Nyquist frequency.

(5. Sharpening Image Subjected to Enlargement Process)

As described earlier in the section of Background Art, in the frequency spectrum of the image signal which has been subjected to the enlargement process for horizontally doubling the number of pixels by upconverting the image signal which has the frequency spectrum illustrated in (a) of FIG. 19, there exists no frequency component between the Nyquist frequency fs/2 with respect to the sampling frequency fs and the Nyquist frequency Fbs/2 (=fs) with respect to the new sampling frequency (Fbs) (see FIG. 20). Therefore, in a case where the sharpening process which uses the linear operation as in the case of the conventional technique is carried out with respect to the image signal which has been subjected to the enlargement process, a frequency component which is in the vicinity of the Nyquist frequency fbs/2 is not added to the image signal.

In contrast, according to the signal processing device 500, it is possible to cause the image signal which has been subjected to the sharpening process to contain a frequency component which is higher than the Nyquist frequency (described above). Therefore, for example, FIG. 12 illustrates a frequency spectrum of an image signal obtained by carrying out the sharpening process in the signal processing device 500 with respect to the image signal which has the frequency spectrum illustrated in (a) of FIG. 19. A frequency component which is higher than the Nyquist frequency fs/2 is added to the frequency spectrum (see FIG. 12). Namely, a high-frequency component which is not contained in an original signal is added to the frequency spectrum.

As described earlier, the signal processing device 500 can add, to an image signal, a high-frequency component which cannot be used in the sharpening process that uses the linear operation as in the case of the conventional technique. This allows an image represented by the image signal which has been subjected to the enlargement process to be sharper.

(6. Effect)

As described above, the higher harmonic wave HW generated by the higher harmonic wave generating section 101 is a signal obtained by carrying out the nonlinear process with respect to the nonlinear process target signal S11 in which a low-level signal such as noise that is contained in the frequency component SF to be supplied to the higher harmonic wave generating section 101 has been removed. Namely, the higher harmonic wave generating section 101 generates the higher harmonic wave HW by carrying out the nonlinear process with respect to the nonlinear process target signal S11 and retaining a sign of the nonlinear process target signal S11.

The higher harmonic wave HW is identical in sign to the nonlinear process target signal S11. Note that, in a case where a low-level signal such as noise that is contained in the frequency component SF is not removed, the higher harmonic wave generating section 101 generates the higher harmonic wave HW by carrying out the nonlinear process with respect to the frequency component SF to be supplied to the higher harmonic wave generating section 101. The higher harmonic wave HW is identical in sign to the frequency component SF. Namely, the higher harmonic wave generating section 101 generates the higher harmonic wave HW by carrying out the nonlinear process with respect to the frequency component SF and retaining a sign of the frequency component SF.

After the nonlinear process has been carried out, the higher harmonic wave HW contains a frequency component which is higher than the Nyquist frequency fs/2 with respect to the sampling frequency fs of the frequency component SF. Therefore, the output signal Sout which has been reconstructed by the signal reconstruction section 300 by use of the higher harmonic wave HW which is generated by the higher harmonic wave generating section 101 contains a high-frequency component which is not contained in the input signal Sin.

Accordingly, a rise and a fall of the output signal Sout are steeper than those of a signal obtained by sharpening the input signal Sin by use of the linear operation as in the case of the conventional technique.

Accordingly, the sharpening process which is carried out by the signal processing device 500 allows an image to be more highly sharpened and allows greater improvement in image quality as compared to the sharpening process by use of the linear operation.

Note that the signal processing device 500 can have a simple arrangement as described earlier with reference to FIGS. 1, 2, 3, 4, 7, and 10. Therefore, a television receiver or the like can easily include the signal processing device 500. This allows not only a static image but also a moving image to be displayed in real time to improve in image quality at no great cost.

Also in a case where the signal processing device 500 receives an image signal which has been subjected to the enlargement process, the signal processing device 500 can generate a higher harmonic wave which exceeds the Nyquist frequency fs/2. Therefore, an image which has been subjected to the enlargement process can be sharpened and the image can greatly improve in image quality. For example, assume that an image obtained by carrying out the enlargement process with respect to an image signal of a standard definition television (SDTV) is displayed in a display of a receiver of a high definition television (HDTV). In a case where the display of the receiver of the high definition television (HDTV) includes the signal processing device 500, the image which has been subjected to the enlargement process can be displayed in a state in which the image has improved in image quality.

Also in a case where an image signal for an HDTV is upconverted to be displayed in a display (a 4K display) whose number of pixels is approximately 4000×2000 and is larger than that of an HDTV, an image represented by the image signal which has been subjected to the upconverting can be displayed in a state in which the image has improved in image quality.

(7. Verification Using Actual Image)

The following description discusses, with reference to FIGS. 13 and 14, actual images which have been subjected to the sharpening process carried out by use of the conventional technique that uses the linear operation and by the signal processing device 500.

First, FIG. 13 shows an image (hereinafter described as an original image) which includes an image to be subjected to the sharpening process. Note that due to space limitation, the original image (see FIG. 13) has a smaller size than its actual size.

Next, (a) of FIG. 14 shows an image obtained by doubling the length and the breadth of an upper right region of the original image illustrated in FIG. 13. Assume here that the image (see (a) of FIG. 14) is subjected to the sharpening process and described as a target image P. Note that the target image P has no frequency component in the vicinity of the Nyquist frequency Fbs/2 (=fs) with respect to the sampling frequency Fbs (=2fs) of the image signal which has been subjected to the enlargement process (described above).

Subsequently, (b) of FIG. 14 shows an image obtained by carrying out the sharpening process with respect to the target image P by use of the conventional technique which uses the linear operation. In this case, the target image P, which has no frequency component in the vicinity of the Nyquist frequency Fbs/2 (=fs), improves in image quality less greatly. Therefore, the image (see (a) of FIG. 14) and the image (see (b) of FIG. 14) do not seem to be so different in sharpness and resolution.

Then, (c) of FIG. 14 shows an image obtained by carrying out the sharpening process with respect to the target image P in the signal processing device 500. It is revealed that the image (see (c) of FIG. 14) has a higher sharpness and a higher resolution of, for example, a brightness of eyes and the bridge of the nose of a figure, a pattern of a scarf, and a backrest of a chair as compared to the image (see (b) of FIG. 14).

As described earlier, the signal processing device 500 in accordance with the present embodiment allows especially an image which has been subjected to the enlargement process to be sharper and have a higher image quality as compared to the conventional technique by which the sharpening process is carried out by use of the linear operation.

(8. Multiplying Factor α Multiplied by Limiter)

As described above, the higher harmonic wave generating section 101 carries out the nonlinear process with respect to each of a part or all of frequency components ($SF_n$ through $SF_m$) obtained by removing the lowest frequency component from frequency components into which the frequency component decomposition section 200 has decomposed, so as to generate higher harmonic waves ($HW_n$ through $HW_m$).

Note here that, as commonly known, a frequency component in a higher frequency range has smaller energy. Accordingly, of the frequency components $SF_n$ through $SF_m$ into which the frequency component decomposition section 200 has decomposed, a frequency component in a higher frequency range has smaller energy.

In contrast, of the higher harmonic waves $HW_n$ through $HW_m$, a higher harmonic wave in a higher frequency range contributes to (i) emphasizing a contour part of an image represented by the output signal Sout which is reconstructed by the signal reconstruction section 300 and (ii) sharpening the image. Accordingly, it is preferable that a higher harmonic wave in a higher frequency range of the higher harmonic waves $HW_n$ through $HW_m$, have as large energy as possible.

Therefore, in order to cause a higher harmonic wave in a higher frequency range of the higher harmonic waves $HW_n$ through $HW_m$ which are generated by the higher harmonic wave generating section 101 to have large energy, the multiplying factor α which is multiplied in the amplitude adjustment process that is carried out by the limiter 51 of the higher harmonic wave generating section 101 is set for each frequency component to be supplied to the higher harmonic wave generating section 101. Specifically, it is preferable that the multiplying factor α be set higher which is used in the limiter 51 of the higher harmonic wave generating section 101 that receives a higher frequency component.

For example, the following description takes, as an example, a case where the frequency component decomposition section 200a (described earlier with reference to FIG. 3) carries out the multi-resolution analysis by use of the wavelet transform, so as to decompose the input signal Sin into frequency components $SF_1$ through $SF_4$ in four frequency ranges. Note here that the higher harmonic wave generating section 101a receives the frequency components $SF_2$ through $SF_4$.

Note here that, since the frequency component decomposition section 200a carries out the multi-resolution analysis by use of the wavelet transform, the frequency component $SF_3$ is located in a frequency range which is two times higher than a frequency range in which the frequency component $SF_2$ is located. Note also that the frequency component $SF_4$ is located in a frequency range which is two times higher than the frequency range in which the frequency component $SF_3$ is located.

Therefore, in this case, the multiplying factor α which is used in the limiter 51 of the higher harmonic wave generating section 101a that receives the frequency component $SF_3$ is set to be two times higher than the multiplying factor α which is used in the limiter 51 of the higher harmonic wave generating section 101a that receives the frequency component $SF_2$. Further, the multiplying factor α which is used in the limiter 51 of the higher harmonic wave generating section 101a that receives the frequency component $SF_4$ is set to be two times higher than the multiplying factor α which is used in the limiter 51 of the higher harmonic wave generating section 101a that receives the frequency component $SF_3$.

As described earlier, in a case where the multiplying factor α which is used in the limiter 51 is set in accordance with each of the frequency components $SF_n$ through $SF_m$ to be supplied to the higher harmonic wave generating section 101, a higher harmonic wave in a higher frequency range of the higher harmonic waves $HW_n$ through $HW_m$ has larger energy than in a case where the multiplying factor α which is used in the limiter 51 is all set to an identical value.

In a case where the multiplying factor α is thus set, an image represented by the output signal Sout can be sharper than in a case where the multiplying factor α which is used in the limiter 51 is all set to an identical value.

(9. Frequency Characteristic of HPF Used in Multi-resolution Analysis Using Wavelet Transform)

An LPF and an HPF are used in pairs to decompose a frequency component into a high-frequency component and a low-frequency component in the multi-resolution analysis by use of the wavelet transform (described earlier with reference to FIG. 3). Similarly, an LPF and an HPF are used in pairs to compose a high-frequency component and a low-frequency component in the signal reconstruction by use of the wavelet inverse transform. An LPF and an HPF which are thus used in pairs are referred to as so-called Quadrature Mirror Filters.

For example, in order to obtain the frequency component S93 and the frequency component S94 from the input signal Sin, the LPF 251 and the HPF 253 are used in pairs (see FIG. 3). In order to obtain the frequency component S95, the LPF 332 and the HPF 334 are used in pairs.

Note here that the multi-resolution analysis by use of the wavelet transform and the wavelet inverse transform enables a so-called perfect reconstruction. Namely, in a case where each frequency component is used into which the frequency component decomposition section 200 has decomposed by use of the wavelet transform, it is possible to restore an original signal by use of the wavelet inverse transform. In order to realize the perfect reconstruction, characteristics of an LPF and an HPF which are used in pairs are commonly in symmetry.

The following description discusses, with reference to (a) of FIG. 15, common frequency characteristics of an LPF and an HPF which are used in pairs in the wavelet transform and the wavelet inverse transform. (a) of FIG. 15 schematically illustrates common frequency characteristics of an LPF and an HPF which are used in pairs in the wavelet transform and the wavelet inverse transform.

An LPF which easily transmits a low-frequency component has a smaller frequency characteristic LA at a higher frequency (see (a) of FIG. 15). In contrast, an HPF which easily transmits a high-frequency component has a larger frequency characteristic HA at a higher frequency. The frequency characteristic LA and the frequency characteristic HA are commonly in symmetry (see (a) of FIG. 15).

Alternatively, since the signal processing device 500 allows obtainment of the output signal Sout that has been subjected to a process for sharpening an image represented by the input signal Sin, the signal processing device 500 does not necessarily need to cause the wavelet transform and the wavelet inverse transform to realize the perfect reconstruction. Therefore, frequency characteristics of an LPF and an HPF which are used in pairs in the frequency component decomposition section 200 and the signal reconstruction section 300 may be in asymmetry.

Further, since the signal processing device 500 uses an HPF to extract a high-frequency component, it is preferable that the HPF transmit as many frequency components as possible. This is because of the following reason. For example, as more frequency components are transmitted through an HPF provided in the frequency component decomposition section 200, the higher harmonic wave generating section 101 carries out the nonlinear process with respect to more frequency components. This allows an image represented by the output signal Sout to be sharper.

The following description discusses, with reference to (b) of FIG. 15, frequency characteristics of an LPF and an HPF which are used in pairs in the wavelet transform and the wavelet inverse transform that are carried out in the present embodiment. (b) of FIG. 15 schematically illustrates frequency characteristics of an LPF and an HPF which are used in pairs in the wavelet transform used by the frequency component decomposition section 200b and in the wavelet inverse transform used by the signal reconstruction section 300b. The frequency characteristic LA and the frequency characteristic HA may be in asymmetry (see (b) of FIG. 15).

As described above, especially in order to allow transmission of more frequency components, it is preferable to use, in the wavelet transform and the wavelet inverse transform which are carried out in the present embodiment, an HPF which easily transmits a frequency component that is lower than a common frequency component (see (b) of FIG. 15).

(10. Modification)

(10-1. Sharpening Process Carried Out in Vertical Direction and Time Direction)

The above description discusses the input signal Sin assuming that the input signal Sin is constituted by a data row (a series of pixel values) consisting of pixel values of pixels which are provided so as to be adjacent to each other in a horizontal direction (a lateral direction, a main scanning direction) of an image. In this case, the signal processing device 500 carries out the sharpening process with respect to an image represented by the input signal Sin by emphasizing a contour part of the image in a vertical direction.

Alternatively, the signal processing device 500 carries out the sharpening process with respect to the image represented by the input signal Sin in a vertical direction (a perpendicular direction, a subscanning direction) of the image.

In this case, it is only necessary that before decomposing the input signal Sin into frequency components in different frequency ranges, the frequency component decomposition section 200 rearrange the input signal Sin to a data row (a series of pixel values) consisting of pixel values of pixels which are provided so as to be adjacent to each other in a vertical direction of an image represented by the input signal Sin. Thereafter, it is only necessary that the frequency component decomposition section 200 decompose the input signal Sin thus rearranged into frequency components in different frequency ranges. Then, it is only necessary that the signal reconstruction section 300 carry out the signal reconstruction and then rearrange the input signal Sin to a data row consisting of pixel values of pixels which are provided so as to be adjacent to each other in a horizontal direction of an image.

Note that, in a case where an external device of the signal processing device 500 generates the input signal Sin assuming that the input signal Sin is constituted by a data row (a series of pixel values) consisting of pixel values in a vertical direction of an image, it is only necessary that the frequency component decomposition section 200 decompose the input signal Sin as it is into frequency components in different frequency ranges.

Note that it is more preferable that the signal processing device 500 carry out the sharpening process not only in one of a horizontal direction and a vertical direction but also in both the horizontal direction and the vertical direction of an image represented by the input signal Sin. This allows the signal processing device 500 to sharpen each of contour parts of the image in the horizontal direction and the vertical direction, respectively.

Further, in a case where the signal processing device 500 carries out the sharpening process with respect to an moving image to be displayed in a television receiver or the like, it is preferable that the signal processing device 500 carry out the sharpening process in a time direction in addition to a horizontal direction and a vertical direction of the moving image since a pixel value changes as time passes.

In this case, it is only necessary that before decomposing the input signal Sin into frequency components in different frequency ranges, the frequency component decomposition section 200 rearrange the input signal Sin to a data row (a series of pixel values) consisting of pixel values of pixels which are provided so as to be adjacent to each other in a time direction of each pixel of a moving image represented by the input signal Sin. Then, it is only necessary that the frequency component decomposition section 200 carry out the multi-resolution analysis with respect to the input signal Sin thus rearranged.

According to this, since a moving image can be sharpened in its time direction, it is possible to prevent occurrence of a residual image, for example.

(10-2. Another Arrangement Example of the Frequency Component Decomposition Section and the Signal Reconstruction Section)

The arrangement example of the frequency component decomposition section 200b (described earlier with reference to FIG. 3) is arranged to carry out the multi-resolution analysis by use of a common wavelet transform. Alternatively, the frequency component decomposition section 200b can further include the higher harmonic wave generating section 101. Similarly, the arrangement example of the signal reconstruction section 300b (described earlier with reference to FIG. 3) is arranged to carry out the signal reconstruction by use of a common wavelet inverse transform. Alternatively, the signal reconstruction section 300b can further include the higher harmonic wave generating section 101.

Therefore, the following description discusses another arrangement example of the frequency component decomposition section 200 and the signal reconstruction section 300b with reference to FIG. 16. Note that an arrangement of the higher harmonic wave generating section 101 is not described here. The higher harmonic wave generating section 101 may be arranged in accordance with any of arrangement examples of the higher harmonic wave generating section 101 that are described above and later.

FIG. 16 is a block diagram illustrating an arrangement of the frequency component decomposition section 200c and the signal reconstruction section 300c. The frequency component decomposition section 200c is obtained by causing the frequency component decomposition section 200b (see FIG. 3) to further include the higher harmonic wave generating section 101 which is provided between the HPF 253 and the downsampler 254.

As described earlier, the frequency component decomposition section 200c which includes the higher harmonic wave generating section 101 at a stage subsequent to the HPF can enhance therein a high-frequency component which is generated while the multi-resolution analysis is being carried out with respect to the input signal Sin. Namely, the frequency component decomposition section 200c can preliminarily enhance a frequency component to be supplied to the higher harmonic wave group generating section 100.

Accordingly, a rise and a fall of a signal of the higher harmonic waves $HW_3$ and $HW_4$ which have been generated by the higher harmonic wave group generating section 100 of the frequency component decomposition section 200c are steeper than those of the higher harmonic waves $HW_3$ and $HW_4$ which have been generated by the higher harmonic wave group generating section 100 of the frequency component decomposition section 200b.

Note that the frequency component decomposition section 200c is arranged to include the higher harmonic wave generating section 101 following the HPF 253. It is only necessary that the frequency component decomposition section 200c include the higher harmonic wave generating section 101 at a stage subsequent to the HPF 253. The frequency component decomposition section 200c may include the higher harmonic wave generating section 101 following the downsampler 254.

The frequency component decomposition section 200c may also include the higher harmonic wave generating section 101 at a stage subsequent to each of the HPF 263 and the HPF 273.

The frequency component decomposition section 200c (see FIG. 16) is arranged to decompose a frequency component into up to two levels. The frequency component decomposition section 200c which is arranged to decompose a frequency component into not less than three levels can also further include the higher harmonic wave generating section 101 at a stage subsequent to each of the HPFs.

The signal reconstruction section 300c is obtained by causing the signal reconstruction section 300b (see FIG. 3) to further include the higher harmonic wave generating section 101 at a stage subsequent to each of the HPF334 and the HPF344.

As described earlier, the signal reconstruction section 300c which includes the higher harmonic wave generating section 101 at a stage subsequent to the HPF can enhance therein a high-frequency component which is generated while the signal reconstruction is being carried out.

Accordingly, S25 and S26 which are generated by the signal reconstruction section 300c can be more enhanced than S95 and S96 which are generated by the signal reconstruction section 300b.

Accordingly, an image represented by the output signal Sout which has been reconstructed by the signal reconstruction section 300c is shaper than an image represented by the output signal Sout which has been reconstructed by the signal reconstruction section 300b.

Note that the signal reconstruction section 300c may further include the higher harmonic wave generating section 101 at a stage subsequent to the HPF 354. The signal reconstruction section 300c (see FIG. 16) is arranged to carry out the signal reconstruction in accordance with a frequency component which has been decomposed into up to two levels. The frequency component decomposition section 300c which is arranged to carry out the signal reconstruction in accordance with a frequency component which has been decomposed into not less than three levels can also further include the higher harmonic wave generating section 101 at a stage subsequent to each of the HPFs.

(10-3. Another Arrangement Example 1 of the Higher Harmonic Wave Generating Section)

The higher harmonic wave generating section 101 may carry out the nonlinear operation by various methods other than the methods described above. Therefore, arrangement examples of the higher harmonic wave generating section 101d and 101e are to be described with reference to FIGS. 17 and 18.

First, FIG. 17 is a block diagram illustrating the arrangement of the higher harmonic wave generating section 101d. The higher harmonic wave generating section 101d includes the low-level signal removing section 11, the nonlinear process section 102d, and the addition section 15 (see FIG. 17). Since the low-level signal removing section 11 and the addition section 15 are identical to those described above, a specific description thereof is omitted here.

Note that, in a case where it is unnecessary to remove a low-level signal of the frequency component SF, e.g., in a case where extremely few low-level signals such as noise are contained in the frequency component SF, the higher harmonic wave generating section 101d does not need to include the low-level signal removing section 11 and may include only the nonlinear process section 102d and the addition section 15.

Note that, in a case where the higher harmonic wave generating section 101d includes only the nonlinear process section 102d and the addition section 15, the frequency component SF is assumed as the nonlinear process target signal S11 as it is.

The nonlinear process section 102d includes a square operation section 61, a first differentiation section 71, a second differentiation section 81, and a multiplication section 91.

The square operation section 61 squares the nonlinear process target signal S11, so as to generate a square signal S61. Namely, assuming that data rows constituting the nonlinear process target signal S11 are X1, X2, X3, . . . , the square signal S61 obtained by squaring the nonlinear process target signal S11 becomes a digital signal constituted by data rows $X1^2$, $X2^2$, and $X3^2$, . . . .

Next, the first differentiation section 71 differentiates the square signal S61 which is generated by the square operation section 61, so as to generate a first differential signal S71. Note that the first differentiation section 71 is arranged as in the case of the differentiation section 31, for example.

Subsequently, the second differentiation section 81 differentiates the frequency component SF, so as to generate a second differential signal S81. Note that the second differentiation section 81 is arranged as in the case of the differentiation section 31, for example.

Then, the multiplication section 91 multiplies the first differential signal S71 and the second differential signal S81, so as to generate the nonlinear process signal S12. Namely, assuming that data rows constituting the first differential signal S71 are U1, U2, U3, . . . and data rows constituting the second differential signal S81 are V1, V2, V3, . . . , the nonlinear process signal S12 becomes a digital signal constituted by data rows U1•V1, U2•V2, U3•V3, . . . .

Note that the above description discusses the nonlinear process section 102d which is arranged to include the square operation section 61 so as to carry out the nonlinear operation. Alternatively, the square operation section 61 may be replaced with a biquadratic operation section which raises the nonlinear process target signal S11 to the fourth power. More commonly, the square operation section 61 may be replaced with an exponentiation operation section which generates a signal corresponding to an exponentiation of the nonlinear process target signal S11 in which exponentiation an exponent is an even number not less than 2.

(10-4. Another Arrangement Example 2 of the Higher Harmonic Wave Generating Section)

The higher harmonic wave generating section 101d described above is arranged to include the square operation section 61. Alternatively, the square operation section 61 may be replaced with an absolute value process section 62 which finds an absolute value of an inputted signal.

Therefore, the arrangement example of the higher harmonic wave generating section 101e which includes the absolute value process section 62 is to be described with reference to FIG. 18. FIG. 18 is a block diagram illustrating the arrangement of the higher harmonic wave generating section 101e.

The higher harmonic wave generating section 101e includes the low-level signal removing section 11, the nonlinear process section 102e, and the addition section 15 (see FIG. 18). Since the low-level signal removing section 11 is identical to that described above, a specific description thereof is omitted here.

Note that, in a case where it is unnecessary to remove a low-level signal of the frequency component SF, e.g., in a case where extremely few low-level signals such as noise are contained in the frequency component SF, the higher harmonic wave generating section 101e does not need to include the low-level signal removing section 11 and may include only the nonlinear process section 102e and the addition section 15. Note that, in a case where the higher harmonic wave generating section 101e includes only the nonlinear process section 102e and the addition section 15, the frequency component SF is assumed as the nonlinear process target signal S11 as it is.

The nonlinear process section 102e includes the absolute value process section 62, the first differentiation section 71, the second differentiation section 81, and the multiplication section 91. Since the first differentiation section 71, the second differentiation section 81, and the multiplication section 91 are identical to those described above, a specific description thereof is omitted here.

The absolute value process section 62 generates an absolute value signal S62 which corresponds to an absolute value of the nonlinear process target signal S11. Namely, assuming that data rows constituting the nonlinear process target signal S11 are X1, X2, X3, . . . , the absolute value signal S62 becomes a digital signal constituted by data rows |X1|, |X2|, and |X3|, . . . .

Next, the first differentiation section 71 differentiates the absolute value signal S62 which is generated by the absolute value process section 62, so as to generate a first differential signal S72.

Then, the multiplication section 91 multiplies the first differential signal S72 and the second differential signal S81, so as to generate the nonlinear process signal S12.

(10-5. Application to Voice Signal)

The above description discusses the signal processing device 500 assuming that the signal processing device 500 is arranged to carry out the sharpening process for sharpening an image. However, the signal processing device 500 may carry out the sharpening process with respect to not only a digital signal representing an image but also a digital signal (voice signal) representing a voice. Namely, a voice signal may be used as the input signal Sin to be supplied to the signal processing device 500. In this case, the signal processing device 500 outputs the output signal Sout in which a rise and a fall of the voice signal have been steepened. Note that also in this case, the output signal Sout contains a high-frequency component which is not contained in the input signal Sin (a frequency component which is higher than the Nyquist frequency). Therefore, in a case where the sharpening process is carried out by the signal processing device 500, a rise and a fall of a voice signal can be steeper than in a case where the sharpening process is carried out by use of the linear operation.

(11. Addition)

Finally, each block of a signal processing device 500 can be implemented by a hardware logic or by software by use of a CPU (central processing unit) as below.

In a case where the each block is implemented by software, the signal processing device 500 (especially a higher harmonic wave group generating section 100, a frequency component decomposition section 200, and a signal reconstruction section 300) includes (i) a CPU which executes a command of a control program that implements each function of the signal processing device 500, (ii) a ROM (read only memory) in which the control program is stored, (iii) a RAM (random access memory) which extracts the control program, (iv) a storage device (a storage medium) such as a memory in which the control program and various sets of data are stored, and (v) the like. The object of the present invention is attainable by supplying, to the signal processing device 500, a storage medium in which program codes (an executable program, an intermediate code program, and a source program) of a control program of the signal processing device 500 which control program is software that implements the each function are computer-readably recorded and causing a computer (or a CPU or an MPU) of the signal processing device 500 to read out and carry out the program codes recorded in the storage medium.

Examples of the storage medium include (i) tapes such as a magnetic tape and a cassette tape, (ii) disks including magnetic disks such as a Floppy (Registered Trademark) disk and a hard disk, and optical disks such as a CD-ROM, an MO, an MD, a DVD, and a CD-R, (iii) cards such as an IC card (including a memory card) and an optical card, and (iv) semiconductor memories realized by a mask ROM, EPROM, EEPROM, a flash ROM, and the like.

The signal processing device 500 can be connected to a communication network, via which the program codes can be supplied to the signal processing device 500. Such a communication network is not particularly limited. Examples of the communication network includes the Internet, an intranet, an extranet, a LAN, ISDN, VAN, a CATV communications network, a virtual private network, a telephone network, a mobile telecommunications network, and a satellite communication network. A transmission medium of which a communication network is composed is not particularly limited. Examples of the transmission medium includes wired transmission media such as IEEE1394, a USB, a power-line carrier, a cable TV circuit, a telephone line, and ADSL and wireless transmission media such as infrared communication systems such as IrDA and a remote controller, Bluetooth (Registered Trademark), IEEE802.11 wireless communication system, HDR, a mobile phone network, a satellite circuit, and a digital terrestrial network. Note that the present invention can also be realized in a form of a computer data signal in which the program codes are embodied by an electronic transmission and which is embedded in carrier waves.

As described earlier, means does not necessarily herein refer to physical means but encompasses a case where a function of each means is implemented by software. Further, a function of one means may be implemented by two or more physical means. Alternatively, functions of two or more means may be implemented by one physical means.

As described earlier, a signal processing device in accordance with the present invention which carries out a process for sharpening an image with respect to an input signal representing the image, so as to output an output signal representing the image which has been sharpened, the signal processing device includes: frequency component decomposition means for decomposing the input signal into a plurality of frequency components in different frequency ranges; higher harmonic wave generating means for generating a higher harmonic wave for each of a part or all of frequency components obtained by removing a frequency component in the lowest frequency range from frequency components into which the frequency component decomposition means has decomposed; and output signal generating means for composing (i) the higher harmonic wave generated by the higher harmonic wave generating means and (ii) a frequency component for which no higher harmonic wave has been generated by the higher harmonic wave generating means of the frequency components into which the frequency component decomposition means has decomposed, so as to generate the output signal, the higher harmonic wave generating means including: nonlinear process means for generating a nonlinear process signal (i) in which positive and negative signs of a frequency component for which the higher harmonic wave is to be generated are retained and (ii) which broadly monotonically increases nonlinearly with respect to the frequency component when the frequency component is located at least in the vicinity of 0 (zero); and addition means for adding the nonlinear process signal to the frequency component, so as to generate the higher harmonic wave.

A method in accordance with the present invention for controlling a signal processing device which carries out a process for sharpening an image with respect to an input signal representing the image, so as to output an output signal representing the image which has been sharpened, the method includes the steps of: (a) decomposing the input signal into a plurality of frequency components in different frequency ranges; (b) generating a higher harmonic wave for each of a part or all of frequency components obtained by removing a frequency component in the lowest frequency range from frequency components into which the step (a) has decomposed; and (c) composing (i) the higher harmonic wave generated by the step (b) and (ii) a frequency component for which no higher harmonic wave has been generated by the step (b) of the frequency components into which the step (a) has decomposed, so as to generate the output signal, the step (b) including the steps of: (d) generating a nonlinear process signal (i) in which positive and negative signs of a frequency component for which the higher harmonic wave is to be generated are retained and (ii) which broadly monotonically increases nonlinearly with respect to the frequency component when the frequency component is located at least in the vicinity of 0 (zero); and (e) adding the nonlinear process signal to the frequency component, so as to generate the higher harmonic wave.

Note here that the higher harmonic wave is generated by, for example, adding (i) the frequency component for which the higher harmonic wave is to be generated and (ii) the nonlinear process signal which has been subjected to a nonlinear process for, for example, squaring the frequency component. In the higher harmonic wave thus generated, positive and negative signs of the frequency component for which the higher harmonic wave is to be generated are retained.

The higher harmonic wave which is generated by being subjected to such a nonlinear process contains a high-frequency component which is not contained in an original frequency component. This allows the output signal which has been composed by use of the higher harmonic wave thus generated to contain a frequency component higher than a Nyquist frequency which is half of a sampling frequency that is used to discretize the input signal.

Accordingly, the nonlinear process carried out by the signal processing device in accordance with the present invention allows a rise and a fall of a signal which correspond to contour parts (edges) included in an image to be steeper as compared to a process for carrying out a linear operation with respect to an input signal. This yields an effect of allowing the image to be sharper and allowing great improvement in image quality.

Especially in a case where an image signal representing an image which has been subjected to an enlargement process is an input signal, in the process for carrying out the linear operation with respect to the input signal, it is impossible to extract a frequency component higher than the Nyquist frequency which is half of the sampling frequency of the image signal which has been subjected to the enlargement process. In contrast, according to the signal processing device in accordance with the present invention, it is possible to add, to the image signal which has been subjected to the enlargement process, a frequency component higher than the Nyquist frequency of the image signal which has been subjected to the enlargement process. This yields an effect of allowing great improvement in image quality of the image which has been subjected to the enlargement process.

The signal processing device in accordance with the present invention may be arranged such that: the nonlinear process means includes: even exponentiation operation means for generating an even exponentiation signal by raising, to an even exponent not less than 2, the frequency component for which the higher harmonic wave is to be generated; and sign changing means for generating the nonlinear process signal by reversing positive and negative signs of a part of the even exponentiation signal which part is different in sign from the frequency component which has not been raised.

According to the arrangement, an even exponentiation signal is generated by raising, to an even exponent not less than 2, the frequency component for which the higher harmonic wave is to be generated, and the nonlinear process signal is generated by reversing positive and negative signs of a part of the even exponentiation signal which part is different in sign from the frequency component which has not been raised.

Consequently, the frequency component for which the higher harmonic wave is to be generated is raised to an even exponent not less than 2, and the nonlinear process signal is generated in which positive and negative signs of the frequency component which has not been raised are retained. Therefore, the higher harmonic wave obtained by adding the frequency component and the nonlinear process signal contains a high-frequency component which is not contained in the frequency component for which the higher harmonic wave is to be generated.

Accordingly, the arrangement yields an effect of allowing greater improvement in image quality as compared to the method for carrying out the linear operation with respect to an image signal.

Further, a simple arrangement in which a low pass filter, a high pass filter, and the like are used allows decomposition of an input signal and composition of an output signal, and a simple arrangement in which an exponentiation operation and a sign change are carried out allows implementation of a process for generating a higher harmonic wave. Therefore, the arrangement yields an effect of allowing great improvement, at low cost, in image quality of a moving image which is displayed in real time in a receiver or the like.

The signal processing device in accordance with the present invention may be arranged such that: the nonlinear process means includes: even exponentiation operation means for generating an even exponentiation signal by raising, to an even exponent not less than 2, the frequency component for which the higher harmonic wave is to be generated; differentiation means for generating a differential signal by differentiating the even exponentiation signal; and sign changing means for generating the nonlinear process signal by reversing positive and negative signs of a part of the differential signal which part is different in sign from the frequency component which has not been raised.

According to the arrangement, an even exponentiation signal is generated by raising, to an even exponent not less than 2, the frequency component for which the higher harmonic wave is to be generated, a differential signal is generated by differentiating the even exponentiation signal, and the nonlinear process signal is generated by reversing positive and negative signs of a part of the differential signal which part is different in sign from the frequency component which has not been raised.

Consequently, the frequency component for which the higher harmonic wave is to be generated is raised to an even exponent not less than 2, a direct-current component which may be contained in an exponentiated signal is removed by differentiation, and the nonlinear process signal is generated in which positive and negative signs of the frequency component which has not been raised are retained. Therefore, the higher harmonic wave obtained by adding the frequency component and the nonlinear process signal contains a frequency component which is not contained in the frequency component for which the higher harmonic wave is to be generated.

Accordingly, the arrangement yields an effect of allowing greater improvement in image quality as compared to the method for carrying out the linear operation with respect to an image signal. Note that the arrangement, in which a direct-current component that may be contained in an exponentiated signal is removed by differentiation, yields an effect of allowing greater improvement in image quality as compared to a case where no direct-current component that may be contained in an exponentiated signal is removed.

Further, a simple arrangement in which a low pass filter, a high pass filter, and the like are used allows decomposition of an input signal and composition of an output signal, and a simple arrangement in which an exponentiation operation, a differential operation, and a sign change are carried out allows implementation of a process for generating a higher harmonic wave. Therefore, the arrangement yields an effect of allowing great improvement, at low cost, in image quality of a moving image which is displayed in real time in a receiver or the like.

The signal processing device in accordance with the present invention may be arranged such that the nonlinear process means includes odd exponentiation operation means for generating the nonlinear process signal by raising, to an odd exponent not less than 3, the frequency component for which the higher harmonic wave is to be generated.

According to the arrangement, the nonlinear process signal is generated by raising, to an odd exponent not less than 3, the frequency component for which the higher harmonic wave is to be generated.

Consequently, the nonlinear process signal is generated by raising, to an odd exponent not less than 3, the frequency component for which the higher harmonic wave is to be generated. Therefore, the higher harmonic wave obtained by adding the frequency component and the nonlinear process signal contains a frequency component which is not contained in the frequency component for which the higher harmonic wave is to be generated.

Accordingly, the arrangement yields an effect of allowing greater improvement in image quality as compared to the method for carrying out the linear operation with respect to an image signal.

Further, a simple arrangement in which a low pass filter, a high pass filter, and the like are used allows decomposition of an input signal and composition of an output signal, and a simple arrangement in which an exponentiation operation is carried out allows implementation of a process for generating a higher harmonic wave. Therefore, the arrangement yields an effect of allowing great improvement, at low cost, in image quality of a moving image which is displayed in real time in a receiver or the like.

The signal processing device in accordance with the present invention may be arranged such that the higher harmonic wave generating means further includes noise removing means for removing noise contained in the frequency component for which the higher harmonic wave is to be generated by the nonlinear process means.

According to the arrangement, noise contained in the frequency component for which the higher harmonic wave is to be generated is removed.

Consequently, the arrangement allows no higher harmonic wave to be generated for noise contained in the frequency component for which the higher harmonic wave is to be generated.

Accordingly, the arrangement yields an effect of preventing noise from being emphasized in an image represented by an output signal.

The signal processing device in accordance with the present invention may be arranged such that the nonlinear process means further includes amplitude adjustment means for adjusting an amplitude of the nonlinear process signal by multiplying the amplitude by a specific multiplying factor.

According to the arrangement, an amplitude of the nonlinear process signal is adjusted by multiplying the amplitude by a specific multiplying factor.

Consequently, a higher harmonic wave can be adjusted to have a suitable amplitude. Accordingly, the arrangement yields an effect of preventing an image represented by an output signal from being too sharp.

The signal processing device in accordance with the present invention may be arranged such that the amplitude adjustment means further removes a signal of the nonlinear process signal, the signal having an absolute value which is greater than an upper limit value.

According to the arrangement, a signal of the nonlinear process signal is removed, the signal having an absolute value which is greater than an upper limit value.

Consequently, a signal value of a higher harmonic wave can be controlled not to exceed an upper limit value. Accordingly, the arrangement yields an effect of preventing an image represented by an output signal from being too sharp.

The signal processing device in accordance with the present invention may be arranged such that the specific multiplying factor is set for each frequency component for which the higher harmonic wave is to be generated.

According to the arrangement, the specific multiplying factor is set for each frequency component for which the higher harmonic wave is to be generated.

Consequently, for example, the arrangement makes it possible to multiply, by a higher multiplying factor, an amplitude of a nonlinear process signal for obtaining a higher harmonic wave for a frequency component in a high-frequency range (i.e., a frequency component whose energy is small) of frequency components for each of which the higher harmonic wave is to be generated. Namely, a higher harmonic wave which has been generated for a frequency component in a higher frequency range can have larger energy.

Note here that a higher harmonic wave in a higher frequency range contributes to sharpening an image represented by an output signal. Therefore, it is preferable that a higher harmonic wave in a higher frequency range have as large energy as possible.

Accordingly, as compared to a case where each nonlinear process signal is multiplied by an identical multiplying factor, the arrangement yields an effect of further sharpening an image represented by an output signal by causing a nonlinear process signal for obtaining a higher harmonic wave in a high-frequency range to be multiplied by a high multiplying factor.

The signal processing device in accordance with the present invention may be arranged such that: the input signal represents a pixel group of pixels which are provided so as to be adjacent to each other in a horizontal direction of the image represented by the input signal; and the frequency component decomposition means decomposes the input signal into a plurality of frequency components in different frequency ranges.

According to the arrangement, the input signal representing a pixel group of pixels which are provided so as to be adjacent to each other in a horizontal direction of the image is decomposed into a plurality of frequency components in different frequency ranges.

Consequently, a higher harmonic wave can be generated for each of a part or all of frequency components that are (i) contained in the input signal representing a pixel group of pixels which are provided so as to be adjacent to each other in a horizontal direction of the image and (ii) obtained by removing a frequency component in the lowest frequency range. In addition, an output signal can be generated which is obtained by composing the higher harmonic wave thus generated and a frequency component for which no higher harmonic wave is generated.

Accordingly, the arrangement yields an effect of allowing improvement in image quality by emphasizing a contour part of the image in a vertical direction.

The signal processing device in accordance with the present invention may be arranged such that the frequency component decomposition means decomposes, into a plurality of frequency components in different frequency ranges, a signal representing a pixel group of pixels which are provided so as to be adjacent to each other in a vertical direction of the image represented by the input signal.

According to the arrangement, the input signal representing a pixel group of pixels which are provided so as to be adjacent to each other in a vertical direction of the image is decomposed into a plurality of frequency components in different frequency ranges.

Consequently, a higher harmonic wave can be generated for each of a part or all of frequency components that are (i) contained in the input signal representing a pixel group of pixels which are provided so as to be adjacent to each other in a vertical direction of the image and (ii) obtained by removing a frequency component in the lowest frequency range. In addition, an output signal can be generated which is obtained by composing the higher harmonic wave thus generated and a frequency component for which no higher harmonic wave is generated.

Accordingly, the arrangement yields an effect of allowing improvement in image quality by emphasizing a contour part of the image in a horizontal direction.

The signal processing device in accordance with the present invention may be arranged such that: the input signal represents a moving image; and the frequency component decomposition means decomposes, into a plurality of frequency components in different frequency ranges, a signal representing a pixel group of pixels which are provided so as to be adjacent to each other in a time direction of the moving image represented by the input signal.

According to the arrangement, the input signal representing a pixel group of pixels which are provided so as to be adjacent to each other in a time direction of the moving image is decomposed into a plurality of frequency components in different frequency ranges.

Consequently, a higher harmonic wave can be generated for each of a part or all of frequency components that are (i) contained in the input signal representing a pixel group of pixels which are provided so as to be adjacent to each other in a time direction of the moving image and (ii) obtained by removing a frequency component in the lowest frequency range. In addition, an output signal can be generated which is obtained by composing the higher harmonic wave thus generated and a frequency component for which no higher harmonic wave is generated.

Accordingly, the arrangement yields an effect of allowing improvement in image quality of the moving image in a time direction. For example, the arrangement can prevent occurrence of a residual image.

The signal processing device in accordance with the present invention may be arranged such that: the frequency component decomposition means uses a Laplacian pyramid algorithm to decompose the input signal into a plurality of frequency components in different frequency ranges; and the output signal generating means uses the Laplacian pyramid algorithm to generate the output signal.

Image processing using the Laplacian pyramid algorithm is extensively carried out, and there exist many pieces of library and hardware.

Consequently, the arrangement yields an effect of allowing a reduction in cost since a filter for implementing the frequency component decomposition means does not need to be newly designed in a case where such existing pieces of library and hardware are used.

Further, the arrangement yields an effect of allowing a reduction in cost since merely a change in filter coefficient allows reuse of an existing program and/or existing design data also in a case where a filter is newly designed.

The signal processing device in accordance with the present invention may be arranged such that: the frequency component decomposition means uses a wavelet transform to decompose the input signal into a plurality of frequency components in different frequency ranges; and the output signal generating means uses a wavelet inverse transform to generate the output signal.

Note here that image processing using the wavelet transform is extensively carried out and there exist many pieces of library and hardware.

Consequently, the arrangement yields an effect of allowing a reduction in cost since a filter for implementing the wavelet transform does not need to be newly designed in a case where such existing pieces of library and hardware are used.

Further, the arrangement yields an effect of allowing a reduction in cost since merely a change in filter coefficient allows reuse of an existing program and/or existing design data also in a case where a filter is newly designed.

The signal processing device in accordance with the present invention may be arranged such that Quadrature Mirror Filters have frequency characteristics which are in asymmetry, the Quadrature Mirror Filters being used in pairs in the wavelet transform and the wavelet inverse transform.

Note here that the wavelet transform has a property such that a video which has not been transformed and a video which has been inversely transformed are identical. Such a property is referred to as perfect reconstruction. Note that a property such that a signal which has been transformed is inversely transformed to a signal which has not been transformed is an important property for signal processing. A Fourier transform which is frequently used in a signal analysis also has a property such that a signal which has been transformed is inversely transformed to a signal which has not been transformed.

A filter of the wavelet transform needs to meet a requirement for perfect reconstruction. Therefore, Quadrature Mirror Filters need to have frequency characteristics which are in symmetry. However, perfect reconstruction is not an essential requirement for attainment of the object of the present invention to obtain a higher-resolution image (Namely, Quadrature Mirror Filters do not need to have frequency characteristics which are in symmetry). This is because according to the present invention, an image which has been transformed has a higher resolution than an image which has not been transformed. Therefore, it is clear that such a case does not fall under perfect reconstruction.

Without a constraint of perfect reconstruction, a filter can be designed more freely for implementing the frequency component decomposition means and the output signal generating means. Namely, the arrangement yields an effect of allowing a reduction in cost of designing a filter. For example, it is only necessary to change a filter coefficient by use of existing library and/or existing design data.

Note that the wavelet transform with no constraint of perfect reconstruction is similar in arrangement to the Laplacian pyramid.

Note that it is possible to cause a computer to realize a signal processing device mentioned above. In this case, (i) a control program of the signal processing device for causing a computer to realize the signal processing device by causing the computer to operate as each means mentioned above and (ii) a computer-readable storage medium in which the control program is recorded are both encompassed in the scope of the present invention.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the aforementioned detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention is applicable to a device for processing a digital signal representing an image, a voice, and the like. In particular, the present invention is preferably applicable to, for example, a display device which displays a static image, a moving image, and the like.

REFERENCE SIGNS LIST

11 Low-level signal removing section (Noise removing means)
15 Addition section (Addition means)
21 Nonlinear operation section (even exponentiation operation means)
22 Nonlinear operation section (odd exponentiation operation means)
31 Differentiation section (Differentiation means)
41 Sign changing section (Sign changing means)
51 Limiter (Amplitude adjustment means)
100 Higher harmonic wave group generating section
101, 101a-101e Higher harmonic wave generating section (Higher harmonic wave generating means)
102, 102a-102e Nonlinear process section (Nonlinear process means)
200, 200a-200c Frequency component decomposition section (Frequency component decomposition section)
300, 300a-300c Signal reconstruction section (Output signal generating means)
500 Signal processing device
HW, $HW_n$-$HW_m$ in Higher harmonic wave
SF, $SF_1$-$SF_n$ Frequency component
S11 Nonlinear process target signal
S12 Nonlinear process signal
S21 Nonlinear signal (even exponentiation signal)
S22 Nonlinear signal
S31 Differential signal

The invention claimed is:

1. A signal processing device which carries out a process for sharpening an image with respect to an input signal representing the image, so as to output an output signal representing the image which has been sharpened,
said signal processing device comprising:
frequency component decomposition means for decomposing the input signal into a plurality of frequency components in different frequency ranges;
higher harmonic wave generating means for generating a higher harmonic wave for each of a part or all of frequency components obtained by removing a frequency component in the lowest frequency range from frequency components into which the frequency component decomposition means has decomposed; and
output signal generating means for composing (i) the higher harmonic wave generated by the higher harmonic wave generating means and (ii) a frequency component for which no higher harmonic wave has been generated by the higher harmonic wave generating means of the frequency components into which the frequency component decomposition means has decomposed, so as to generate the output signal,
the higher harmonic wave generating means including:
nonlinear process means for generating a nonlinear process signal (i) in which positive and negative signs of a frequency component for which the higher harmonic wave is to be generated are retained and (ii) which broadly monotonically increases nonlinearly with respect to the frequency component when the frequency component is located at least in the vicinity of 0 (zero); and
addition means for adding the nonlinear process signal to the frequency component, so as to generate the higher harmonic wave.

2. The signal processing device as set forth in claim 1, wherein:
the nonlinear process means includes:
even exponentiation operation means for generating an even exponentiation signal by raising, to an even exponent not less than 2, the frequency component for which the higher harmonic wave is to be generated; and
sign changing means for generating the nonlinear process signal by reversing positive and negative signs of a part of the even exponentiation signal which part is different in sign from the frequency component which has not been raised.

3. The signal processing device as set forth in claim 1, wherein:
the nonlinear process means includes:
even exponentiation operation means for generating an even exponentiation signal by raising, to an even exponent not less than 2, the frequency component for which the higher harmonic wave is to be generated;
differentiation means for generating a differential signal by differentiating the even exponentiation signal; and
sign changing means for generating the nonlinear process signal by reversing positive and negative signs of a part of the differential signal which part is different in sign from the frequency component which has not been raised.

4. The signal processing device as set forth in claim 1, wherein the nonlinear process means includes odd exponentiation operation means for generating the nonlinear process signal by raising, to an odd exponent not less than 3, the frequency component for which the higher harmonic wave is to be generated.

5. The signal processing device as set forth in claim 1, wherein the higher harmonic wave generating means further includes noise removing means for removing noise contained in the frequency component for which the higher harmonic wave is to be generated by the nonlinear process means.

6. The signal processing device as set forth in claim 1, wherein the nonlinear process means further includes amplitude adjustment means for adjusting an amplitude of the nonlinear process signal by multiplying the amplitude by a specific multiplying factor.

7. The signal processing device as set forth in claim 6, wherein the amplitude adjustment means further removes a signal of the nonlinear process signal, the signal having an absolute value which is greater than an upper limit value.

8. The signal processing device as set forth in claim 6, wherein the specific multiplying factor is set for each frequency component for which the higher harmonic wave is to be generated.

9. The signal processing device as set forth in claim 1, wherein:
the input signal represents a pixel group of pixels which are provided so as to be adjacent to each other in a horizontal direction of the image represented by the input signal; and
the frequency component decomposition means decomposes the input signal into a plurality of frequency components in different frequency ranges.

10. The signal processing device as set forth in claim 1, wherein the frequency component decomposition means decomposes, into a plurality of frequency components in different frequency ranges, a signal representing a pixel group of pixels which are provided so as to be adjacent to each other in a vertical direction of the image represented by the input signal.

11. The signal processing device as set forth in claim 1, wherein:
the input signal represents a moving image; and
the frequency component decomposition means decomposes, into a plurality of frequency components in different frequency ranges, a signal representing a pixel group of pixels which are provided so as to be adjacent to each other in a time direction of the moving image represented by the input signal.

12. The signal processing device as set forth in claim 1, wherein:
the frequency component decomposition means uses a Laplacian pyramid algorithm to decompose the input signal into a plurality of frequency components in different frequency ranges; and
the output signal generating means uses the Laplacian pyramid algorithm to generate the output signal.

13. The signal processing device as set forth in claim 1, wherein:
the frequency component decomposition means uses a wavelet transform to decompose the input signal into a plurality of frequency components in different frequency ranges; and
the output signal generating means uses a wavelet inverse transform to generate the output signal.

14. The signal processing device as set forth in claim 13, wherein Quadrature Mirror Filters have frequency characteristics which are in asymmetry, the Quadrature Mirror Filters being used in pairs in the wavelet transform and the wavelet inverse transform.

15. A method for controlling a signal processing device which carries out a process for sharpening an image with respect to an input signal representing the image, so as to output an output signal representing the image which has been sharpened,
said method comprising the steps of:
(a) decomposing the input signal into a plurality of frequency components in different frequency ranges;
(b) generating a higher harmonic wave for each of a part or all of frequency components obtained by removing a frequency component in the lowest frequency range from frequency components into which the step (a) has decomposed; and
(c) composing (i) the higher harmonic wave generated by the step (b) and (ii) a frequency component for which no higher harmonic wave has been generated by the step (b) of the frequency components into which the step (a) has decomposed, so as to generate the output signal,
the step (b) including the steps of:
(d) generating a nonlinear process signal (i) in which positive and negative signs of a frequency component for which the higher harmonic wave is to be generated are retained and (ii) which broadly monotonically increases nonlinearly with respect to the frequency component when the frequency component is located at least in the vicinity of 0 (zero); and
(e) adding the nonlinear process signal to the frequency component, so as to generate the higher harmonic wave.

16. A control program for causing a computer included in a signal processing device recited in claim 1 to operate, the control program causing the computer to function as each means of the signal processing device.

17. A computer-readable storage medium in which the control program recited in claim 16 is recorded.

* * * * *